(12) United States Patent  
Brunswick et al.

(10) Patent No.: US 8,251,567 B2  
(45) Date of Patent: *Aug. 28, 2012

(54) MIXER WITH PIVOTABLE BOWL

(75) Inventors: Brian A. Brunswick, Tipp City, OH (US); Joseph C. Huang, Dayton, OH (US); Brian E. Bader, Springfield, OH (US); Janice J. Schnipke, Springfield, OH (US); Dana D. Herbst, Vandalia, OH (US)

(73) Assignee: Premark FEG L.L.C., Wilmington, DE (US)

( * ) Notice: Subject to any disclaimer, the term of this patent is extended or adjusted under 35 U.S.C. 154(b) by 1058 days.

This patent is subject to a terminal disclaimer.

(21) Appl. No.: 12/097,938

(22) PCT Filed: Dec. 27, 2005

(86) PCT No.: PCT/US2005/047180  
§ 371 (c)(1),  
(2), (4) Date: Jul. 23, 2008

(87) PCT Pub. No.: WO2007/075167  
PCT Pub. Date: Jul. 5, 2007

(65) Prior Publication Data  
US 2008/0291776 A1      Nov. 27, 2008

Related U.S. Application Data

(63) Continuation-in-part of application No. 10/039,930, filed on Oct. 27, 2001, now Pat. No. 6,991,363, which is a continuation-in-part of application No. 09/561,828, filed on Apr. 28, 2000, now Pat. No. 6,494,610.

(51) Int. Cl.  
*A21C 1/00*  (2006.01)  
*B29B 7/22*  (2006.01)

(52) U.S. Cl. .......... 366/98; 366/198; 366/220; 220/751; 220/756; 220/770

(58) Field of Classification Search .......... 366/197–198, 366/98, 220; 220/735, 742, 751, 481, 475, 220/770, 756, 758–759  
See application file for complete search history.

(56) References Cited

U.S. PATENT DOCUMENTS

| | | | |
|---|---|---|---|
| 32,482 A | 6/1861 | Lane |
| 140,527 A | 7/1873 | Munson, Jr. |
| 227,239 A | 5/1880 | Frentress |
| 320,255 A | 6/1885 | Jackman |
| 613,888 A | 11/1898 | Schmuck |
| 735,353 A | 8/1903 | Eifert |

(Continued)

FOREIGN PATENT DOCUMENTS

CN       1481274       3/2004

(Continued)

OTHER PUBLICATIONS

International Search Report issued regarding International Application No. PCT/US2005/047180 (Aug. 2, 2006).

(Continued)

*Primary Examiner* — Yogendra Gupta  
*Assistant Examiner* — Emmanuel S Luk  
(74) *Attorney, Agent, or Firm* — Thompson Hine LLP

(57) ABSTRACT

Mixer systems with pivoting mixer bowl arrangements are provided.

9 Claims, 23 Drawing Sheets

U.S. PATENT DOCUMENTS

| | | | |
|---|---|---|---|
| 760,693 A | 5/1904 | Lancaster et al. | |
| 826,223 A | 7/1906 | Broadwell | |
| 879,590 A | 2/1908 | Roth | |
| 910,648 A | 1/1909 | Davison | |
| 1,143,484 A | 6/1915 | Beach | |
| 1,264,128 A | 4/1918 | Rataiczak | |
| 1,366,114 A | 1/1921 | Boggs | |
| 1,415,735 A | 5/1922 | Trust et al. | |
| 1,428,704 A | 9/1922 | Petri | |
| 1,468,615 A | 9/1923 | Guttenstein et al. | |
| 1,548,041 A | 8/1925 | Johnston et al. | |
| 1,548,919 A | 8/1925 | Ward | |
| 1,562,704 A | 11/1925 | Kevan | |
| 1,634,777 A | 7/1927 | Girdler | |
| 1,695,345 A | 12/1928 | Read | |
| 1,733,945 A | 10/1929 | Dehuff | |
| 1,743,271 A | 1/1930 | Gould | |
| 1,761,237 A | 6/1930 | Schiff | |
| 1,767,002 A | 6/1930 | Johnston et al. | |
| 1,774,509 A | 9/1930 | Gould | |
| 1,781,321 A | 11/1930 | Dehuff | |
| 1,807,589 A | 6/1931 | Edmunds | |
| 2,024,282 A | 12/1935 | Geiger | |
| 2,122,628 A | 7/1938 | Tracy | |
| 2,181,079 A | 11/1939 | Dehuff | |
| 2,251,903 A | 8/1941 | Anstice et al. | |
| 2,613,847 A | 10/1952 | Lacher | |
| 2,931,232 A * | 4/1960 | Martin | 74/16 |
| 3,073,493 A | 1/1963 | Pfaffenberger | |
| 3,075,746 A | 1/1963 | Yablonski et al. | |
| 3,255,913 A | 6/1966 | Helm | |
| 3,533,603 A | 10/1970 | Kovacs | |
| 3,556,341 A | 1/1971 | Rains | |
| 3,633,719 A | 1/1972 | Lynch | |
| 3,758,183 A | 9/1973 | Steinkamp et al. | |
| 4,042,221 A | 8/1977 | Myers et al. | |
| 4,135,828 A | 1/1979 | Cabak | |
| 4,173,925 A | 11/1979 | Leon | |
| 4,283,148 A | 8/1981 | Peterson | |
| 4,402,466 A | 9/1983 | Schmidt | |
| 4,528,718 A | 7/1985 | Brockhaus et al. | |
| 4,765,746 A | 8/1988 | Suay Puig | |
| 4,823,633 A | 4/1989 | Pike | |
| 4,854,711 A | 8/1989 | Hagan | |
| 4,937,916 A | 7/1990 | Redman | |
| 4,946,285 A | 8/1990 | Vennemeyer | |
| 5,048,709 A | 9/1991 | Alverson | |
| 5,123,747 A | 6/1992 | Derksen | |
| 5,157,983 A | 10/1992 | Sankovic | |
| 5,306,083 A | 4/1994 | Caldwell et al. | |
| 5,325,980 A | 7/1994 | Grimm et al. | |
| 5,325,982 A | 7/1994 | Cobb, Jr. | |
| 5,348,393 A | 9/1994 | Pappas, Jr. | |
| 5,385,422 A | 1/1995 | Kruger et al. | |
| 5,409,149 A | 4/1995 | Hough | |
| 5,472,276 A | 12/1995 | Ratermann et al. | |
| 5,494,350 A | 2/1996 | Childress | |
| 5,653,535 A | 8/1997 | Xie et al. | |
| 5,690,427 A | 11/1997 | Jennings | |
| 5,806,704 A | 9/1998 | Jamison | |
| 5,860,738 A | 1/1999 | Brinkman | |
| 5,934,802 A | 8/1999 | Xie | |
| 6,092,647 A | 7/2000 | Yeh et al. | |
| 6,494,610 B1 | 12/2002 | Brunswick | |
| 6,595,680 B2 | 7/2003 | Sanpei et al. | |
| 6,883,959 B2 | 4/2005 | Donthnier et al. | |
| 6,966,691 B2 | 11/2005 | Brunswick et al. | |
| 6,991,363 B2 | 1/2006 | Brunswick et al. | |
| 7,384,187 B2 | 6/2008 | Blackburn et al. | |
| 7,387,430 B2 | 6/2008 | Short et al. | |
| 7,438,463 B2 | 10/2008 | Schnipke et al. | |
| 2002/0093877 A1 | 7/2002 | Brunswick et al. | |
| 2002/0181322 A1 | 12/2002 | Brunswick et al. | |
| 2004/0120213 A1 | 6/2004 | Short et al. | |
| 2004/0120215 A1 | 6/2004 | Huang et al. | |
| 2004/0120216 A1 | 6/2004 | Donthnier et al. | |
| 2004/0208082 A1 | 10/2004 | Huang et al. | |
| 2005/0002272 A1 | 1/2005 | Brunswick et al. | |
| 2005/0141340 A1 | 6/2005 | Donthnier et al. | |

FOREIGN PATENT DOCUMENTS

| | | |
|---|---|---|
| DE | 1070563 | 12/1959 |
| DE | 1298510 | 7/1969 |
| EP | 0637462 | 2/1995 |
| EP | 1027920 | 8/2000 |
| EP | 1114671 | 7/2001 |
| EP | 1151669 | 7/2001 |
| EP | 1151669 | 11/2001 |
| FR | 1079799 | 5/1954 |
| FR | 2728485 | 6/1996 |
| FR | 2740064 | 4/1997 |
| FR | 2805177 | 8/2001 |
| GB | 120393 | 3/1919 |
| GB | 672619 | 5/1952 |
| JP | 11-347390 | 12/1999 |
| TW | 477242 | 2/2002 |
| TW | 530691 | 5/2003 |
| WO | 96/30114 | 10/1996 |
| WO | 03/037494 | 5/2003 |
| WO | 2005/112722 | 12/2005 |

OTHER PUBLICATIONS

Written Opinion issued regarding International Application No. PCT/US2005/047180 (Aug. 2, 2006).
Service Manual, *Models H-600 and H-600_T and L-800 Mixers*, Hobart Corporation (Jul. 1977).
Instructions Manual, *H600 & L800 Mixers*, Hobart Corporation (Dec. 1999).
*Varimixer Food Mixer Model W60* (2 pages), A Welbilt Company (Sep. 1996).
*100% Gear Transmission Mixer* (1 page), American Eagle Food Machinery, Inc. (date unknown).
*The Best Values Just Got Better* (3 pages), Univex (date unknown).
*Heavy Duty Dough Mixers* (3 pages), Spar Mixer (date unknown).
*EM20 Heavy Duty Professional 20 Quart Mixer* (1 page), Dito Dean Food Prep (date unknown).
The Hobart Manufacturing Company—Instruction Manual . . . with catalog of Replacement Parts—Hobart Models A-200 and A-200T Mixers (15 pages) (Feb. 1966).
PCT, International Preliminary Report on Patentability, PCT/US2005/047180 (Jul. 10, 2008).

\* cited by examiner

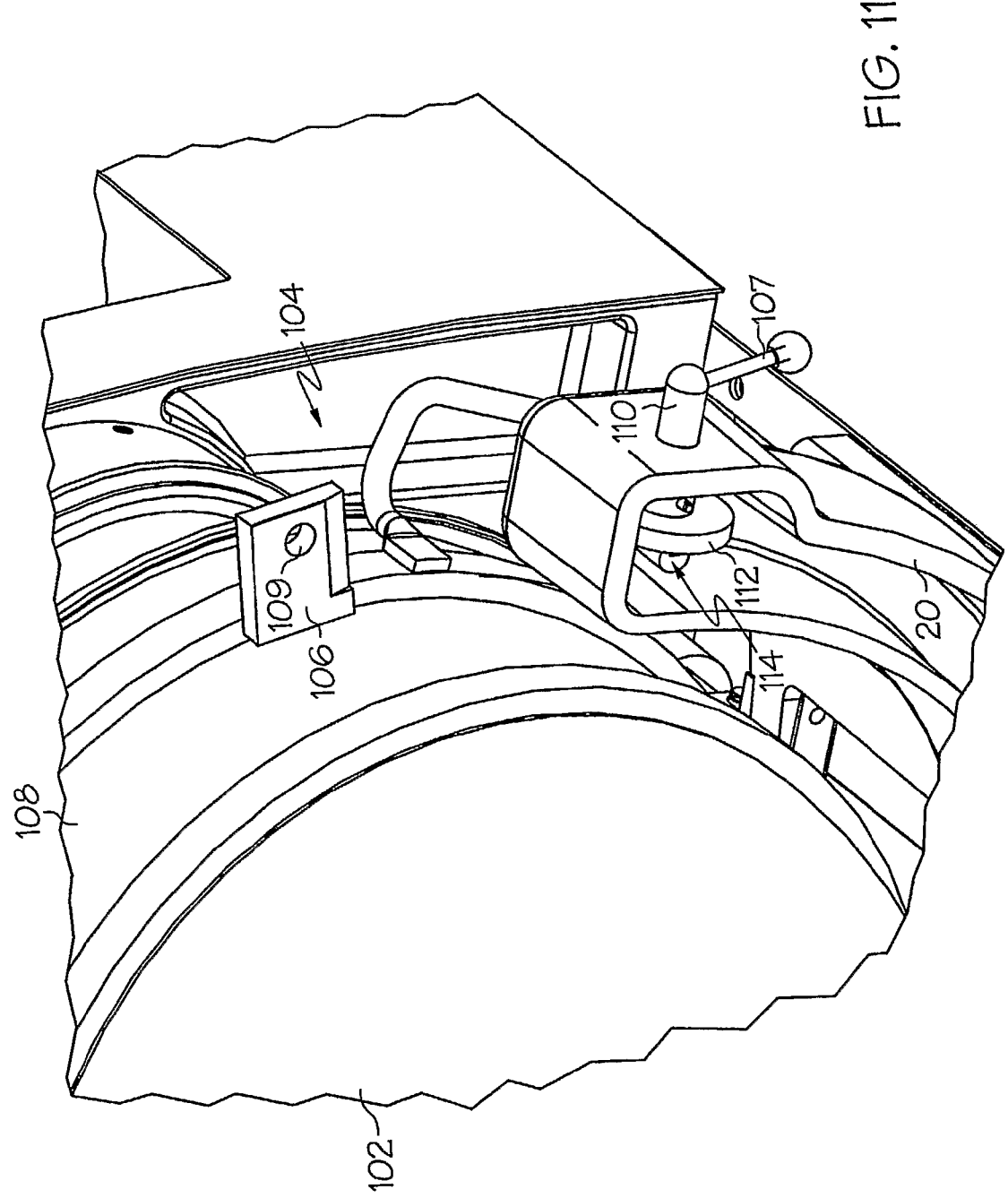

MIXER WITH PIVOTABLE BOWL

This application is a continuation-in-part of U.S. application Ser. No. 10/039,930, filed Oct. 27, 2001, which in turn is a continuation-in-part of U.S. application Ser. No. 09/561,828, filed Apr. 28, 2000.

BACKGROUND

The present application is directed to a bowl that can be pivotally coupled to a mixer, and to a mixer system having a pivotable bowl.

Mixers are used to mix and blend a wide variety of materials. The mixers typically include a mixer body having a motor that drives a generally vertically-extending mixing element, and a bowl that is located below the mixing element. The bowl receives the materials to be mixed and the lower end of the rotatable mixing element therein. The bowl is typically detachable from the mixer body to aid in loading and unloading the materials into the bowl, and to enable cleaning, repair or replacement of the bowl.

In most existing mixers, the mixer bowl is vertically movable relative to the body such that the bowl can be lowered away from the mixing element. The materials to be mixed can then be added to or removed from the bowl while the bowl is in its lowered position. However, even after the bowl is lowered, the user may have difficulty in accessing the bowl to add or remove materials from the bowl due to the location and orientation of the overhang portion of the mixer body relative to the bowl.

Accordingly, there is a need for a mixer having a bowl that provides convenient access to the bowl.

SUMMARY

A mixer system configured for pivoting bowl operation is provided in various embodiments and examples. Corresponding mixer bowl configurations are also provided.

BRIEF DESCRIPTION OF THE DRAWINGS

FIG. 11 is a bottom detail view of the bowl, yoke, and part of the mixer body of FIG. 9;

DETAILED DESCRIPTION

Figure 1:
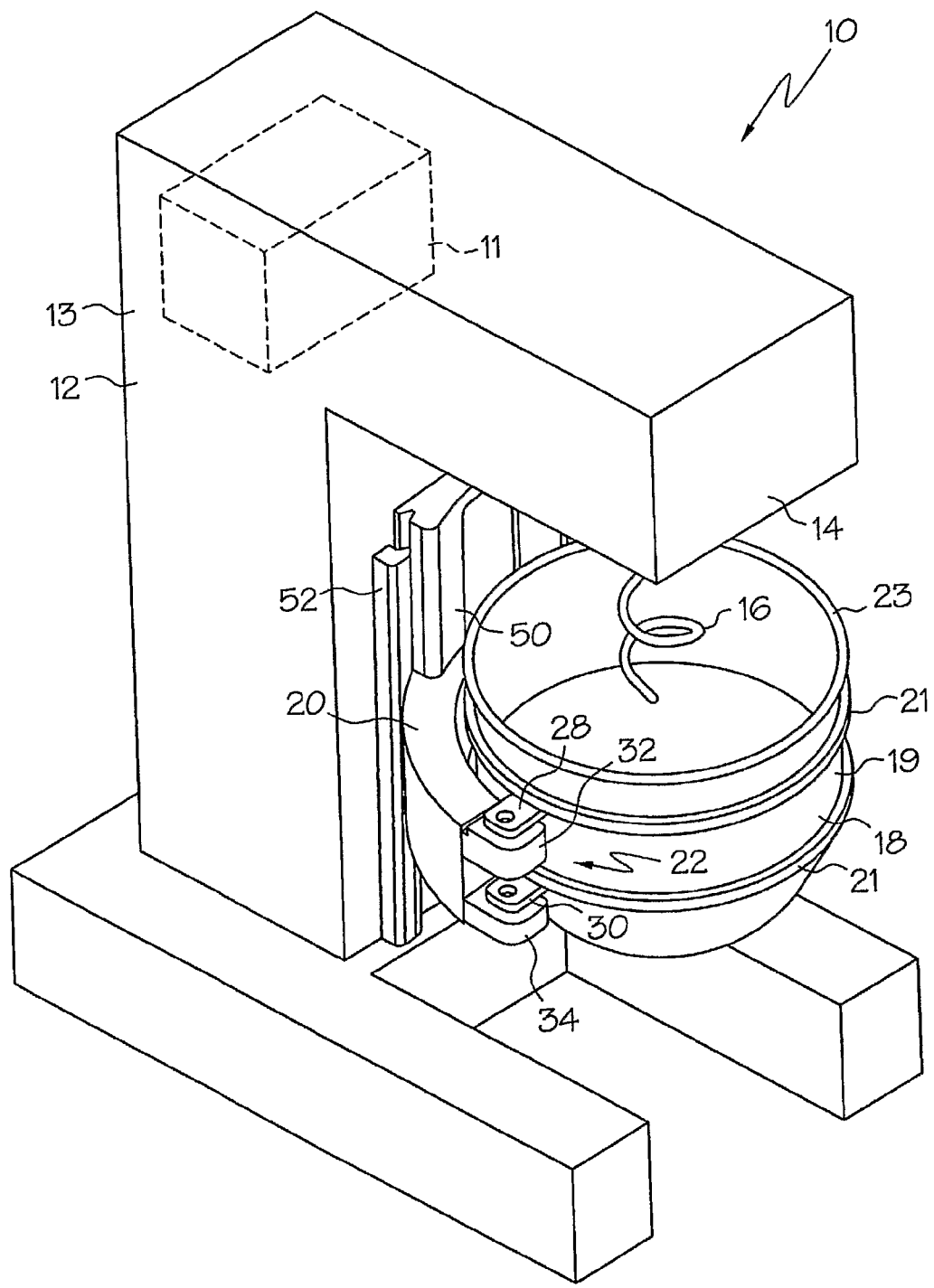
FIG. 1 is a perspective view of one embodiment of the mixer of the present invention.

FIG. 1 illustrates a mixer, generally designated 10, which includes a mixer body 12 having a generally vertically-extending main portion 13 and a overhang portion or transmission head 14. The mixer body 12 includes a yoke 20 coupled to the main portion 13 of the mixer body 12. The yoke 20 is generally semicircular in top view, and is shaped to closely receive a mixer bowl 18 therein. The yoke 20 is coupled to a vertically movable yoke base 50, and the yoke base 50 is vertically movable along a pair of guide rails 52, 54.

Figure 8:
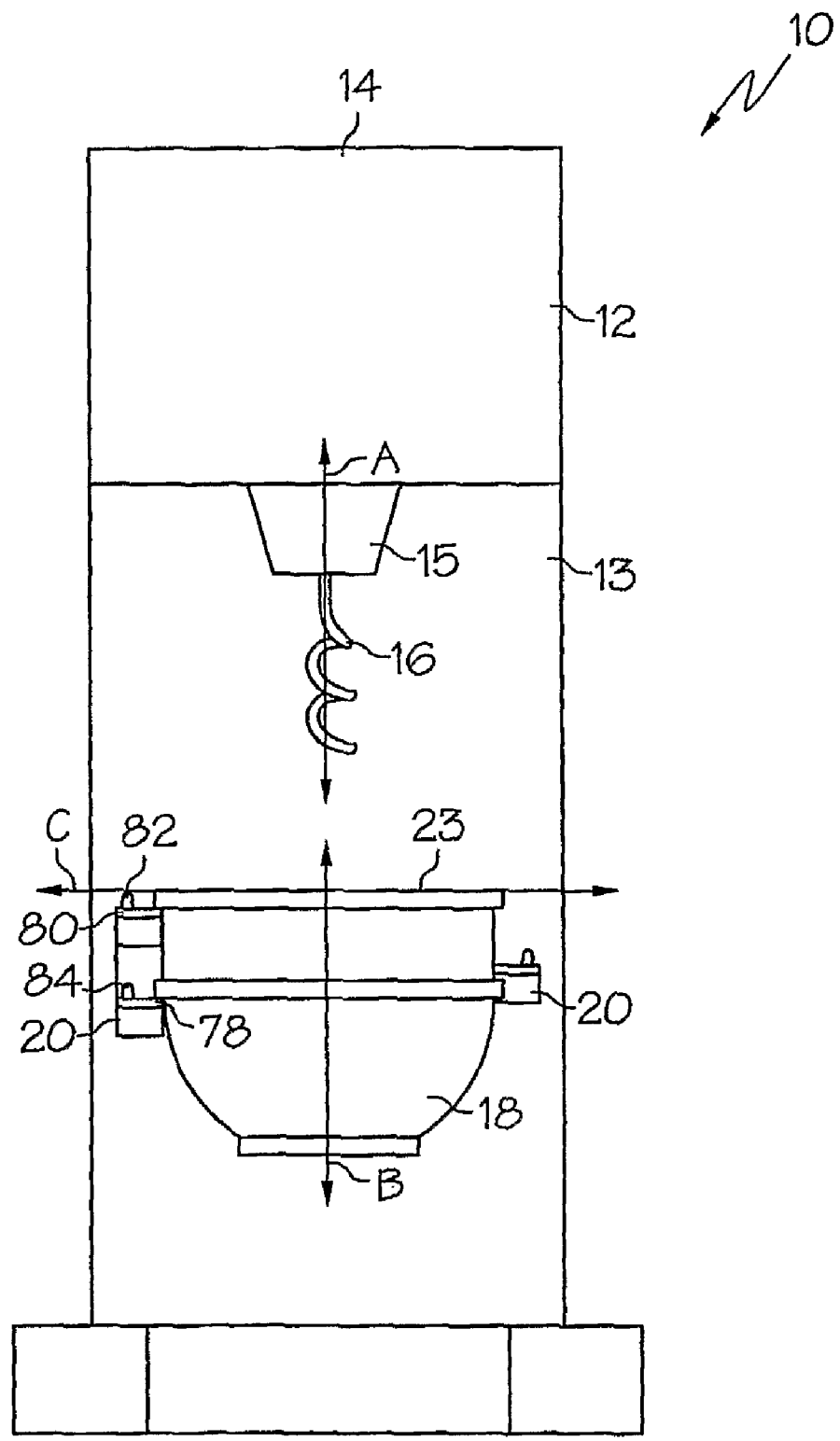
FIG. 8 is a front view schematic representation of the mixer of FIG. 1.

The mixer 10 includes a motor or mixing drive 11 housed in the mixer body 12. The mixing drive 11 is drivingly coupled to an output component 15 (see FIG. 8) to rotate the output component about its central axis A. The mixer 10 includes a generally downwardly-extending mixing element 16 (such as a dough hook) that is removably connected to the output component 15. The mixing element 16 can be any of a wide variety of shapes and can be coupled to the output component 15 by a wide variety of attachment mechanisms, such as a bayonet-style attachment (not shown) as is well known in the art. The bowl 18 is shaped to be mounted to the yoke 20 of the mixer body 12 such that the bowl 18 is closely received in the yoke 20. The bowl 18 includes a bowl body 19 that contains the materials to be mixed (not shown), and a top rim or edge 23 that forms a plane C. The bowl 18 includes a central axis B that is generally perpendicular to the plane C. The bowl 18 also includes pair of vertically spaced bands 21, each band 21 being attached to the bowl body 19, such as by spot welding.

Figure 2:
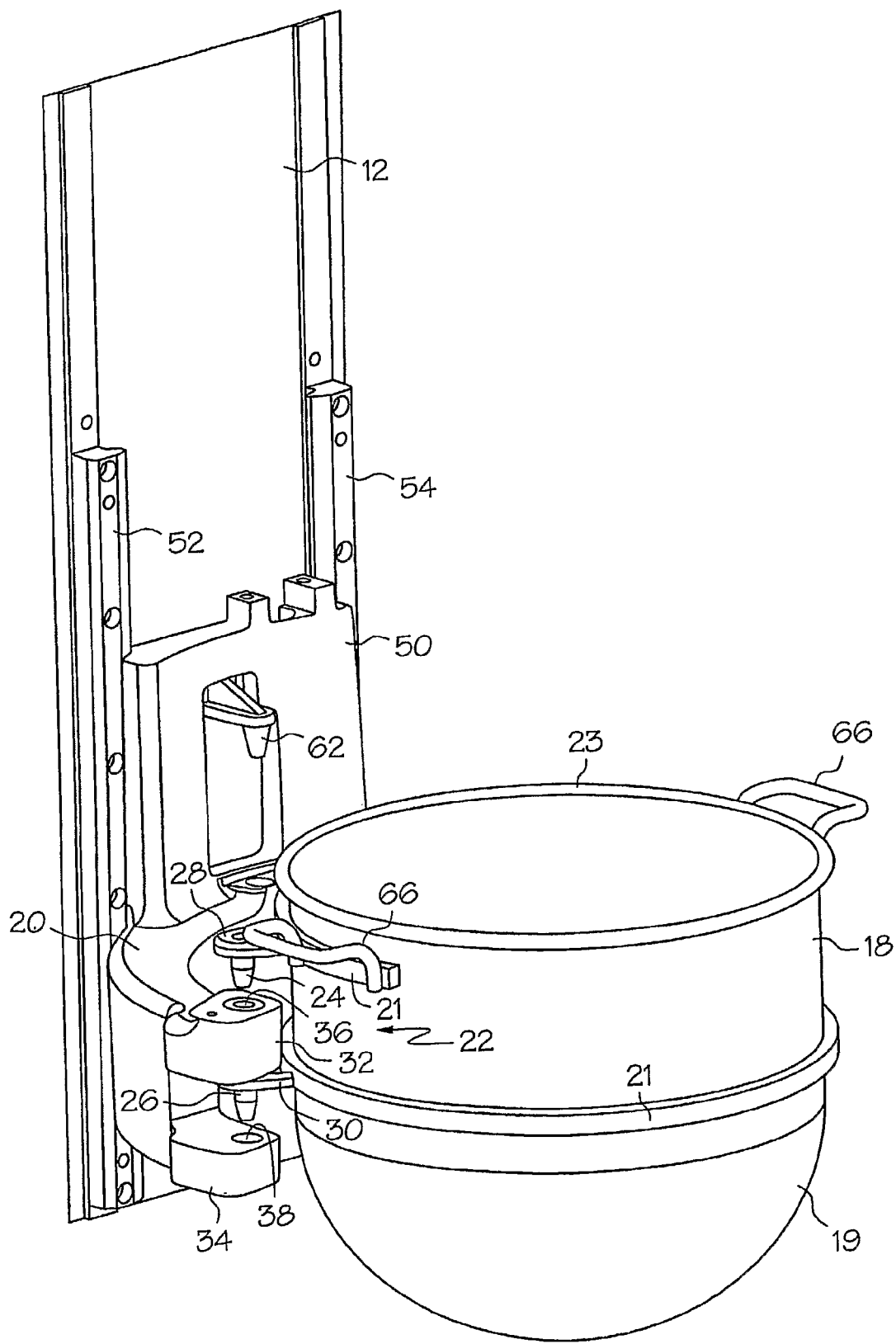
FIG. 2 is a perspective view of the bowl, yoke, and part of the mixer body of the mixer of FIG. 1, with the bowl being vertically spaced away from the yoke.

As shown in FIG. 2, the mixer 10 includes a mounting structure, generally designated 22, which pivotally couples the bowl 18 to the yoke 20 and mixer body 12. In one embodiment, the mounting structure 22 includes a pair of pin arms 28, 30, each pin arm 28, 30 being coupled to and protruding outwardly from the bowl 18. Each pin arm 28, 30 may be coupled to one of the bands, 21, such as by welding, and includes a pin 24, 26, extending generally downwardly from the pin arm 28, 30. In this embodiment, the mounting structure 22 may further include a pair of brackets 32, 34 that are mounted (preferably by casting) onto a distal end of the yoke 20, each bracket 32, 34 having a hole 36, 38 formed therein. As shown in FIG. 2, the pins 24, 26 are generally axially aligned with one another, as are the holes 36, 38.

Figure 3:
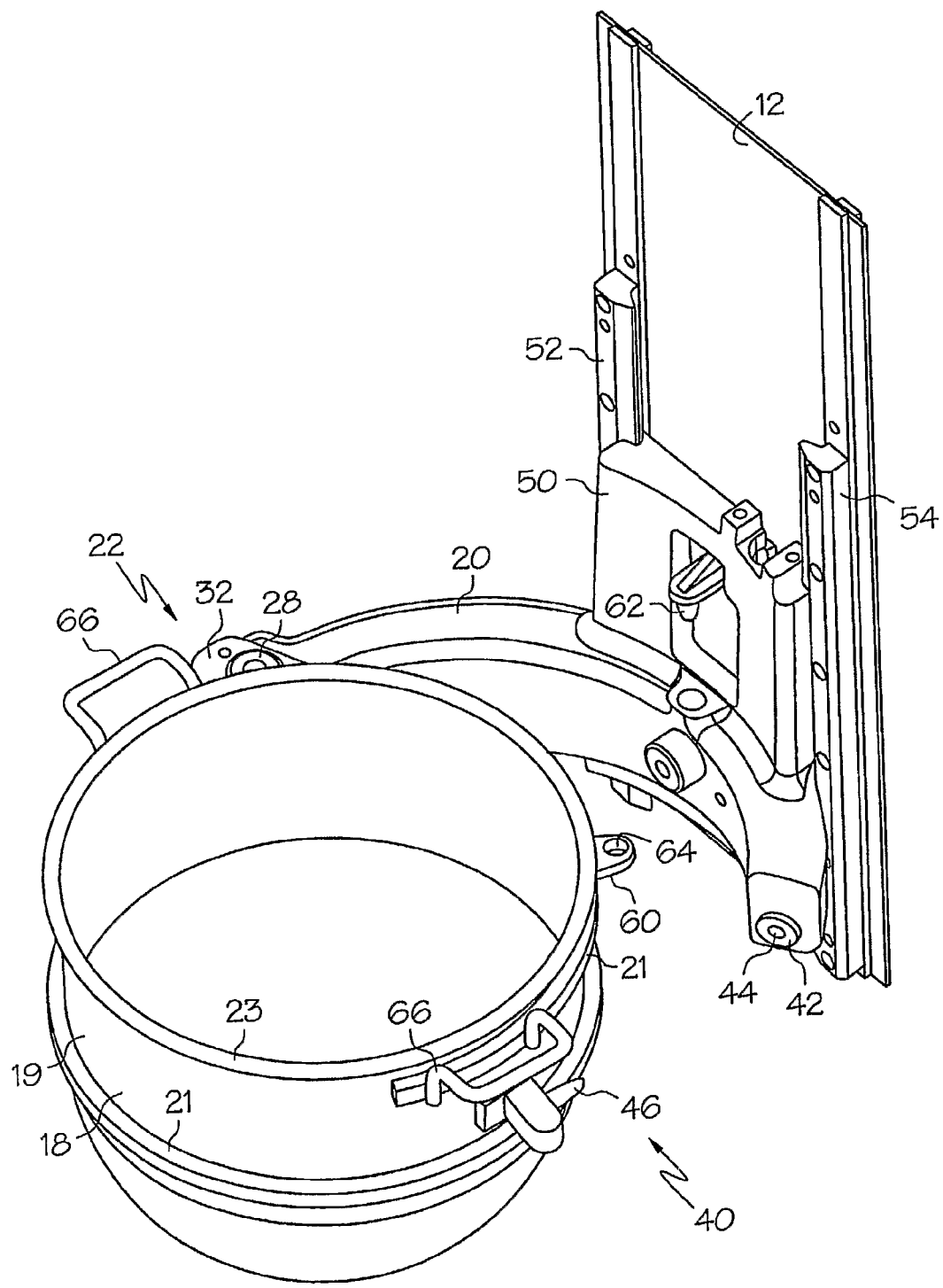
FIG. 3 is a perspective view of the bowl, yoke, and part of the mixer body of FIG. 2, with the bowl coupled to the yoke and in the loading position.

In order to mount the bowl 18 to the mixer body 12, the bowl 18 is positioned such that the pins 24, 26 are aligned with the holes 36, 38 in each bracket 32, 34, as shown in FIG. 2. The bowl 18 is then lowered such that the pins 24, 26 are received in the corresponding holes 36, 38, and the pin arms 28, 30 engage the top surface of the corresponding mounting bracket 32, 34, as shown in FIG. 3. Each pin 24, 26 preferably has a tapered tip to guide the pins 24, 26 into the mounting brackets 32, 34. After each pin 24, 26 is received in a hole 36, 38, each pin/bracket combination forms a hinge about which the bowl 18 can pivot. The bowl 18 is shown in its loading/unloading position in FIG. 3 wherein the bowl is pivoted (at least slightly) away from the mixer body 12 and yoke 20.

Figure 4:
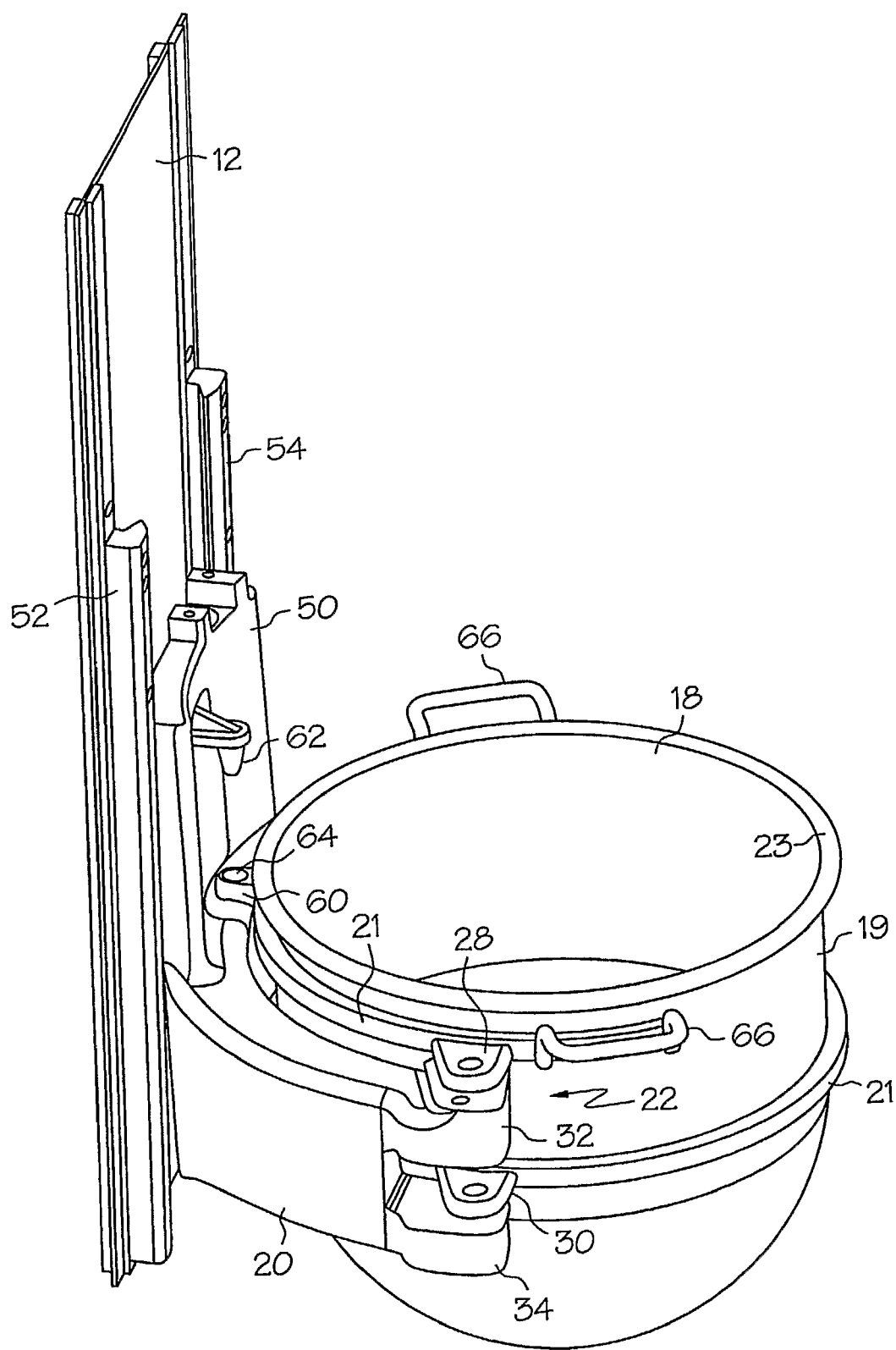
FIG. 4 is a perspective view of the bowl, yoke, and part of the mixer body of FIG. 3, with the bowl in its closed position.

After the bowl 18 is mounted to the mixer body 12, the bowl 18 can then be pivoted from its loading/unloading position of FIG. 3, to its closed position, as shown in FIG. 4. When the bowl 18 is in the closed position, the bowl 18 is located adjacent to the mixer body 12 and received within the yoke 20, and the bowl 18 is aligned such that the mixing element 16 can be received in the bowl 18 when the bowl 18 is raised relative to the mixing element 16. Furthermore, when the bowl 18 is in the closed position, the central axis B of the bowl 18 is preferably aligned with the central axis A of the output component 15, and with the central axis of the mixing element 16.

Figure 5:
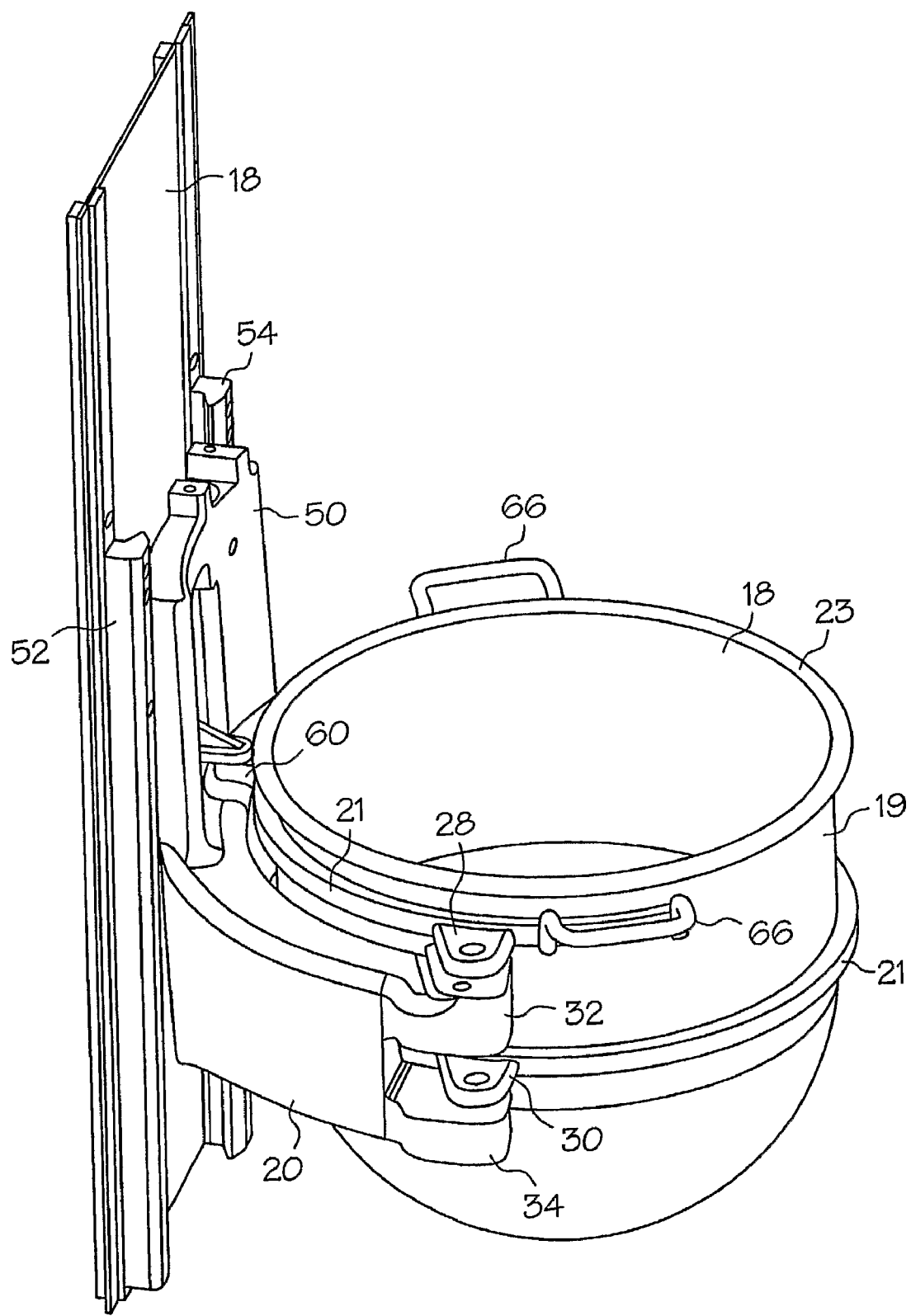
FIG. 5 is a perspective view of the bowl, yoke, and part of the mixer body of FIG. 4, with the bowl in its use position.

In order to move the bowl from its closed position (FIG. 4) to its use position (FIG. 5), the yoke 20 is raised vertically by moving the yoke base 50 along the pair of vertically-extending guide rails 52, 54. Typically, a bowl up/down drive or hand crank (not shown) is used to raise the yoke 20. As the yoke 20 is raised, it also raises the bowl 18 to its use position, as shown in FIGS. 1 and 5. When the bowl 18 is in the use position, the lower portion of the mixing element 16 is received in the bowl 18 such that the mixing element 16 can mix the contents of the bowl 18.

The bowl 18 may include a locking bracket 60 (FIGS. 3 and 4) having an opening 64, and the mixer body 12 may include a generally downwardly-extending locking pin 62. When the bowl 18 is moved to its use position (FIG. 5), the locking pin 62 may be received in the opening 64 of the locking bracket 60 to retain the bowl in the use position; that is, the locking pin/locking bracket combination prevents the bowl 18 from pivoting about the mounting structure 22.

Figure 6:
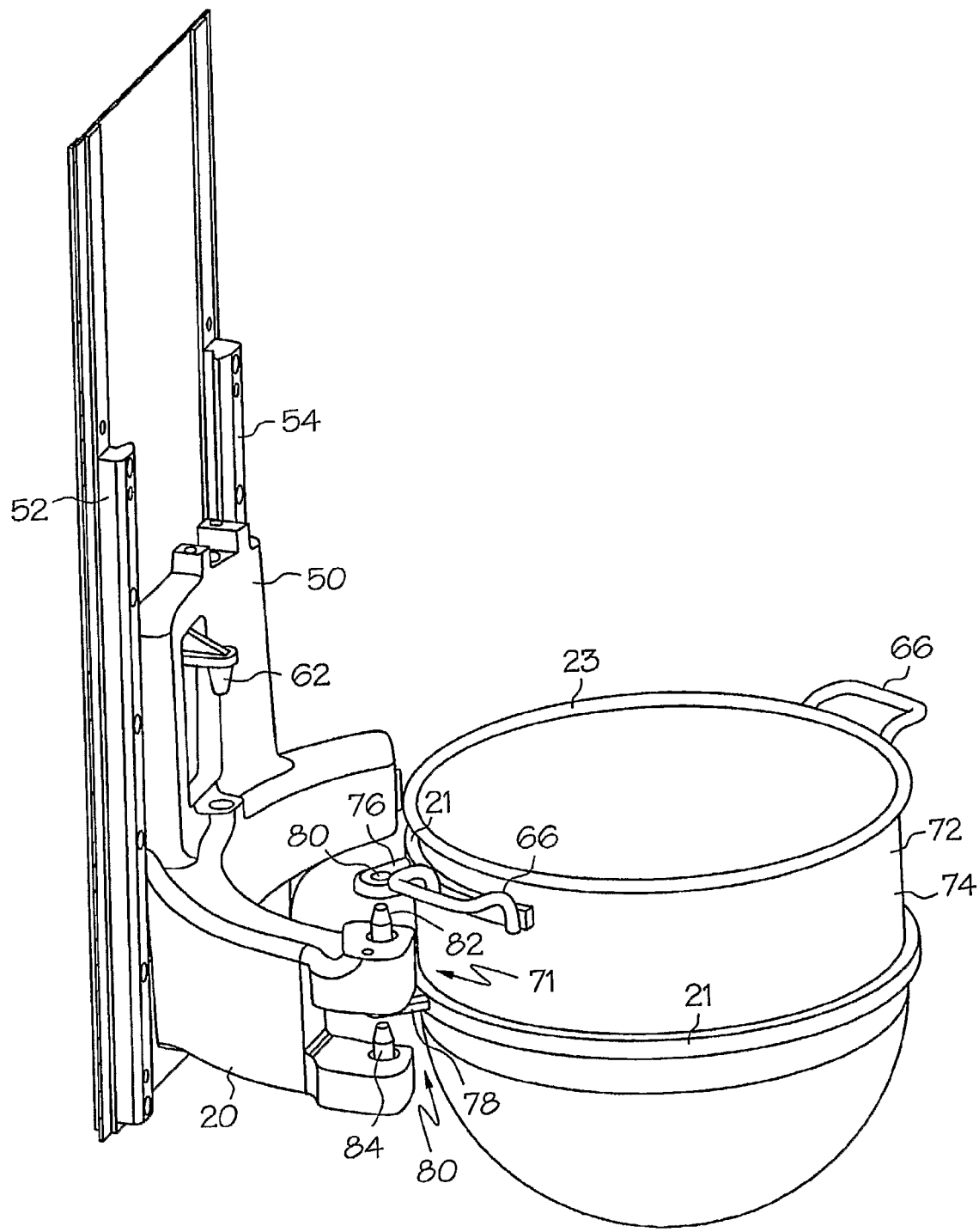
FIG. 6 is a perspective view of a bowl, yoke, and part of mixer body illustrating an alternate embodiment of the mixer of the present invention.

In another embodiment of the invention, the location of the pins and bracket may be reversed. For example, FIG. 6 illustrates a mounting structure 71 for mounting a bowl 72 to the yoke 20. In this embodiment, the bowl 72 has an outer surface 74 and a pair of brackets 76, 78 coupled to and extending outwardly from the outer surface 74. Each bracket 76, 78 may be coupled (such as by welding) to one of the bands 21 and include a generally circular opening 80 formed therein. The mounting structure 71 further includes a pair of pins 82, 84 coupled to and extending upwardly from the yoke 20.

In order to mount the bowl 72 to the yoke 20, the brackets 76, 78 are aligned and located such that the openings 80 can each receive an associated pin 82, 84 therethrough to pivotally couple the bowl 72 to the yoke 20. After the bowl 72 is coupled to the yoke 20, the bowl 72 can be pivoted into and out of the closed position and utilized in the same manner as the bowl 18 described above. Furthermore, it should be understood that the bowl 72 need not necessarily include the brackets 76, 78, and that nearly any structure of the bowl can have the openings 80 formed therein. For example, the bowl 72 may have a lip or other mounting portion (not shown) extending wholly or partially around the perimeter of the bowl 72, and the opening or openings 80 may be located on the lip or other mounting portion. If desired, the lower pin 84 may be slightly shorter than the upper pin 82 to aid in loading and unloading the bowl 72 on the yoke 12.

Figure 7:
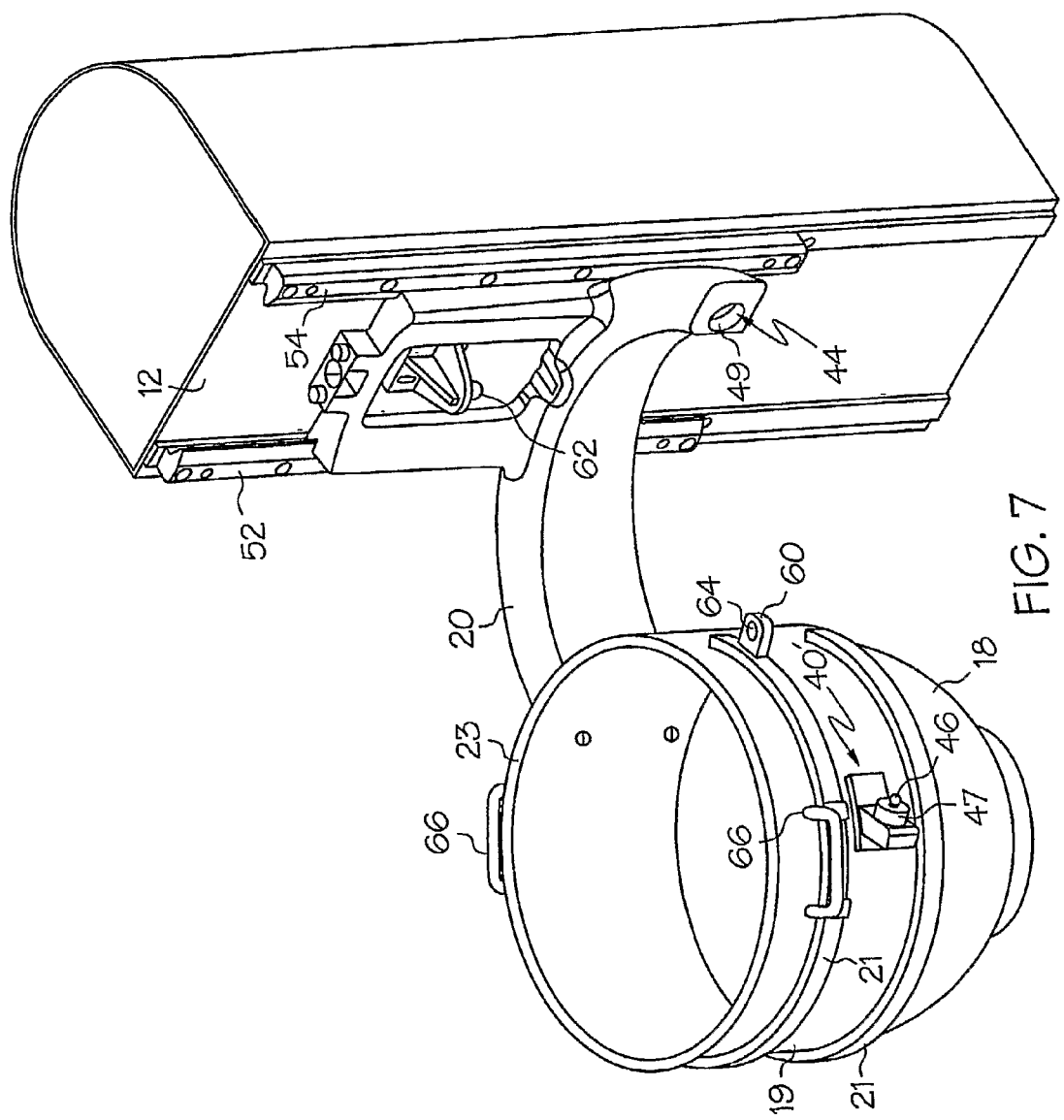
FIG. 7 is a perspective view of a bowl, yoke, and part of a mixer body illustrating a detent mechanism.

The mounting structures 22, 71 enable the bowl 18, 72 to be pivoted out from under the overhang portion 14 of the mixer body 12 to its loading/unloading position, as shown in FIG. 7. While in the loading/unloading position, the bowl 18, 72 provides easy access to the inner cavity of the bowl for loading and unloading materials in the bowl. Furthermore, when in the loading/unloading position, the handles 66 are pivoted away from the mixer body 12 and located in a convenient position for gripping.

The brackets 32, 34 or 76, 78 preferably provide sufficient support so that the central axis B of the bowl 18, 72 is generally not skewed during the pivoting motion of the bowl 18, 72 (i.e., pivoting motion of the bowl into and out of the closed position and the loading/unloading position). More particularly, the orientation of the central axis B of the bowl 18, 72 relative to the mixer body 12 preferably does not generally move during any pivoting motion of the bowl 18, 72. In other words, although the central axis B may be moved laterally during pivoting motion of the bowl, 18, 72 the orientation of the central axis B preferably remains generally stationary relative to the mixer body or the axis A or the axis of rotation of the mixing component 16. In one embodiment, the central axis B of the bowl 18, 72 preferably is and remains generally parallel to the central axis A of the output component 15 and the central axis of the mixing component 16 during any pivoting movement of the bowl 18, 72. The output component 15 may be or include a planetary gear system. In this case, the central axis A of the output component 15 is the central axis about which the planetary gears orbit.

The bowl 18, 72 preferably pivots in the plane C that is defined by the upper lip or edge 23 of the bowl 18, 72 during all pivoting motion of the bowl 18, 72, and the plane C remains stationary relative to the mixer body 12. This feature ensures that the bowl 18, 72 can be rotated smoothly into and out of the closed position such that the user is not required to lift the bowl during any pivoting motion of the bowl 18. The brackets 32, 34, 76, 78 and pins 24, 26, 82, 84 preferably cooperate to ensure such smooth, planar pivoting of the bowl 18, 72. For example, the brackets 32, 34 and 76, 78 are preferably vertically spaced apart from each other by a sufficient distance to prevent the bowl 18, 72 from tilting during its pivoting movement.

Figure 18:
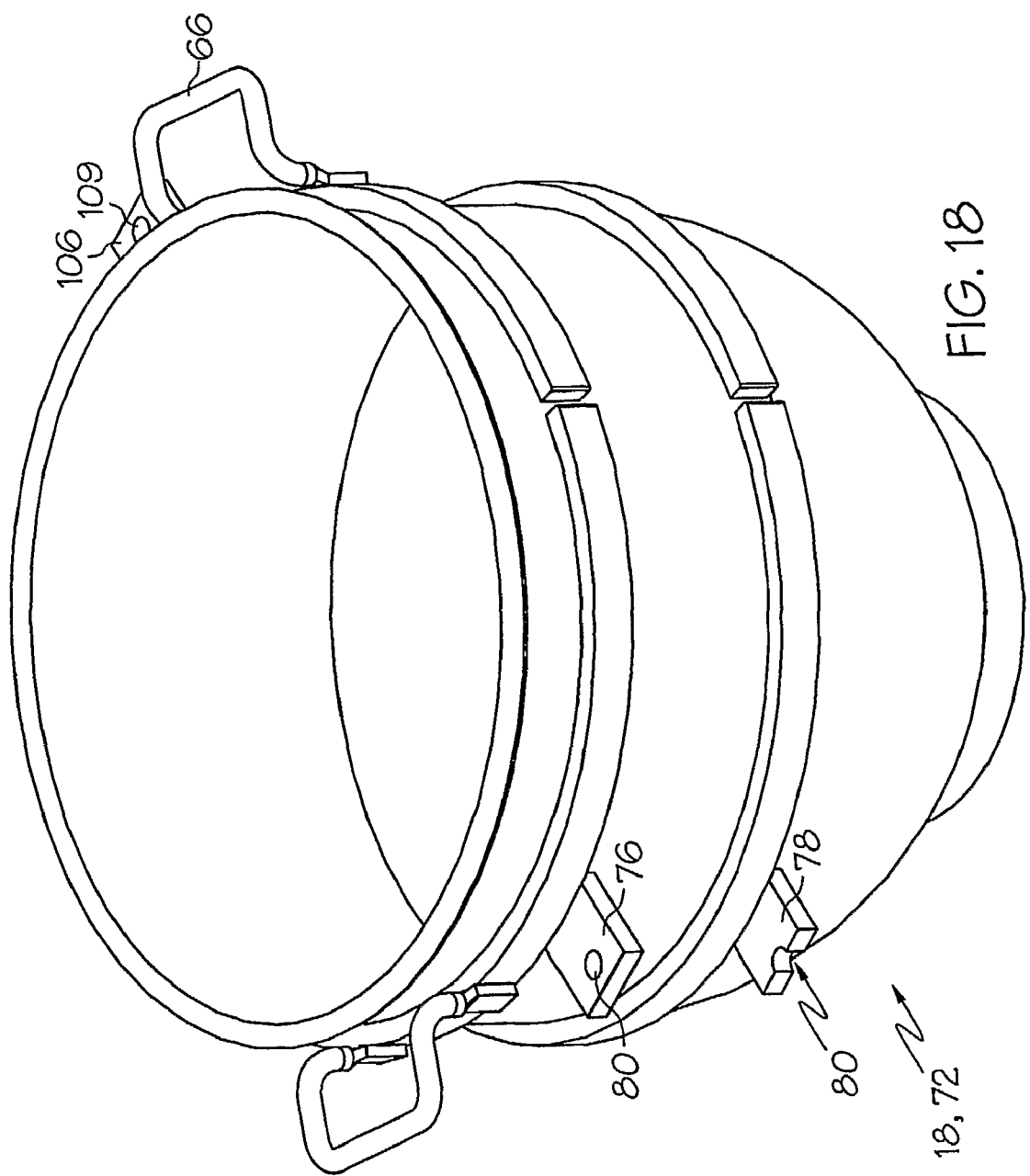
FIG. 18 is a perspective view of another embodiment of a bowl.
Figure 19:
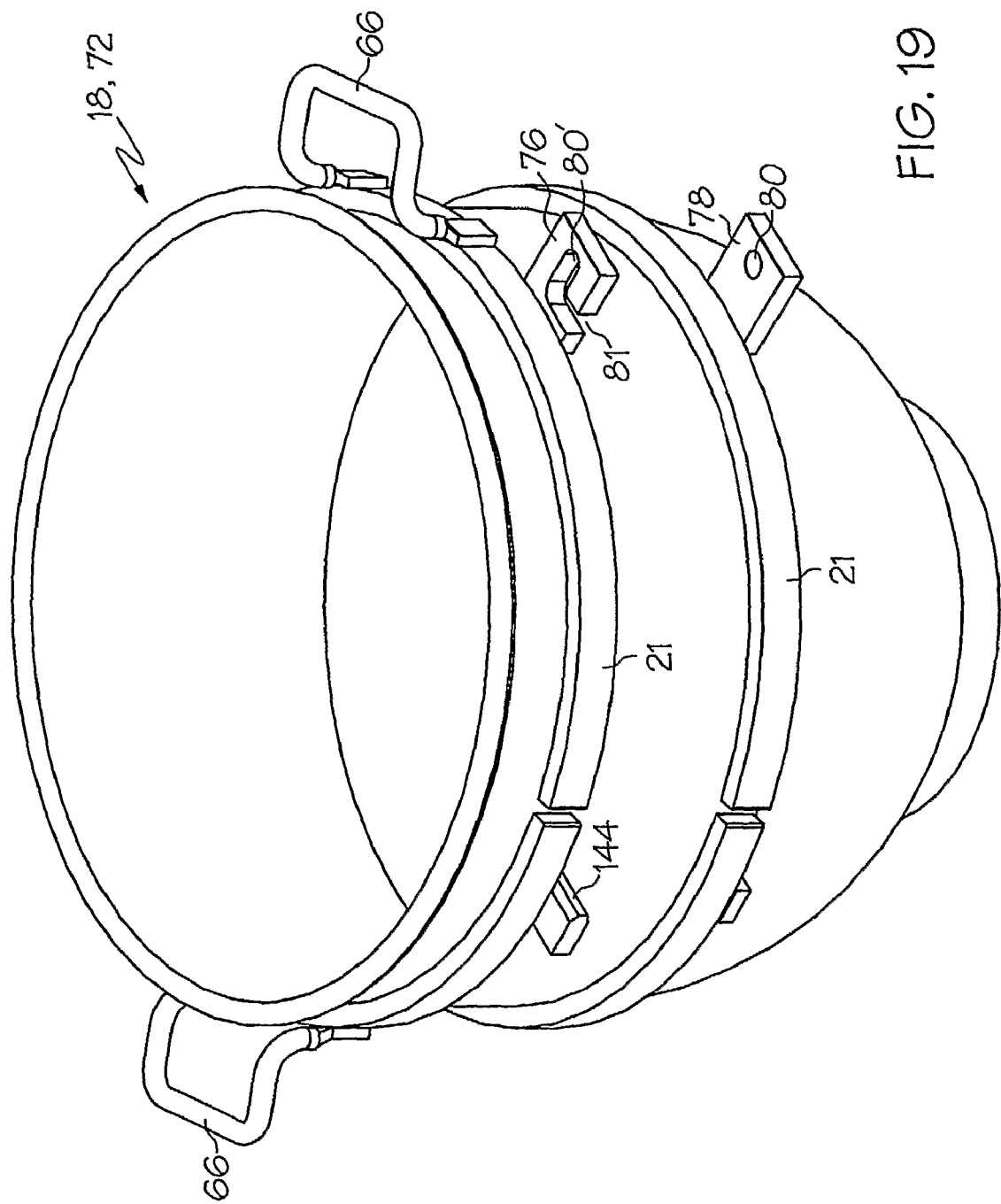
FIG. 19 is a perspective view of another embodiment of a bowl.

Any variety of pins and brackets may be used for mounting the bowl 18 to the mixer body 12. For example, the pins 24, 26, 82, 84 and associated holes or openings preferably have a generally circular, or nearly circular (i.e. hexagonal, elliptical, etc.), cross section, although pins and openings having other shapes may be used without departing from the scope of the invention. For example, as shown in FIGS. 18 and 19, at least one of the brackets 76, 78 may include only a partial opening 80' (i.e. an opening that is not fully enclosed). In FIG. 18, the opening 80' is generally semicircular in top view. In FIG. 19, the opening 80' is a nearly complete opening but includes a slot 81. Thus, it should be understood that the "openings" of the present invention need not necessarily include enclosed openings.

Although each of the bracket 32, 34 (or 76, 78) are illustrated as being attached to the bowl 18, 72, only one of the brackets 32, 34 (or one of the brackets 76, 78) need to be coupled to the bowl 18, 72. When only one of the brackets 32, 34 (or one of the bracket 76, 78) is coupled to the bowl, the other bracket may be coupled to the bracket that is coupled to the bowl. For example, with reference to FIG. 6, only the upper bracket 76 may be coupled to the bowl, and the lower bracket 78 may be coupled to a generally vertically-extending coupling member (not shown) that is located outside of the yoke 20 and coupled to the upper bracket 76. In this manner, the upper bracket 76, lower bracket 78, and coupling member may form a generally "C" shape in side view.

Furthermore, the bowl 18, 72 may be a two-piece bowl. For example, the bowl may include a first part which is an annular collar that includes the associated brackets 32, 34, 76, 78 located thereon. The first part of the bowl may be a collar similar to one of the rings 21, but the collar may be thick enough to support at least two of the vertically-spaced brackets 32, 34, 76, 78. In this case, collar can be pivotally coupled to the yoke, 20, and the second part of the bowl 18, 72 may be a bowl body that has a smooth outer surface that can slip into, or be lifted out of, the collar.

The mixer 10 may include a detent mechanism to maintain the bowl 18, 72 in its closed position while the bowl 18, 72 is raised and lowered, or during mixing operations. For example, FIG. 3 illustrates one detent mechanism, generally designated 40, that may be used to maintain the bowl 18 in its closed position (the detent mechanism 40 may also of course be used with the bowl 72 or any other bowl used with the mixer). In this embodiment, the detent mechanism 40 is preferably located on an opposed side of the bowl 18 relative to the mounting structure 22. In the illustrated embodiment, the detent mechanism 40 includes a relatively soft, deformable washer 42 mounted on the yoke 20 and having a central opening 44 formed therein. The detent mechanism 40 also includes a forwardly extending peg 46 mounted on the bowl 18. The opening 44 in the washer 42 is slightly smaller than the largest portion of the peg 46, such that when the bowl 18 is moved to its closed position, the peg 46 is forced into the washer 42, which retains the peg 46 therein by an interference fit. In this manner, the detent mechanism 40 helps to maintain the bowl 18 in the closed position.

An alternate embodiment of the detent mechanism 40' is shown in FIG. 7. Again, although FIG. 7 illustrates the detent mechanism or guide 40' in conjunction with the bowl 18, the detent mechanism 40' may be used with the bowl 72 or any other bowl used with the mixer. In this embodiment, the peg 46 is mounted onto a washer 47, and the yoke 20 has a recess 49 shaped to receive the washer 47 therein. In this manner the bottom surface of the recess 49 may support some of the weight of the bowl 18 when the bowl 18 is in the closed position, and therefore the yoke 20 can help to support the weight of the bowl 18 when the washer 47 is received in the recess 49.

The portion of the detent mechanisms 40, 40' located on the bowl 18 can be located on nearly any surface of the bowl 18 that can engage a corresponding part located on the mixer body 12. Preferably, the portion of the detent mechanisms 40, 40' located on the bowl 18 are located on a portion of the bowl 18 that is located adjacent the yoke 20 when the bowl 18 is in the closed position. Furthermore, the orientation of various components of the detent mechanisms 40, 40' can be reversed. For example, the peg 46 of the detent mechanism 40 may be located on the mixer body 12 and the washer 42 may be located on the bowl 18. Similarly, the locking bracket 60 may be located on the bowl 18 and the locking pin 62 may be located on the mixer body 12.

FIGS. 9-12 illustrate yet another detent mechanism 104 that may be used with the mixer of the present invention. FIGS. 9-12 illustrate the detent mechanism 104 used with a bowl 102, although the detent mechanism 104 can be used with the bowls 18, 72 shown and described earlier, or nearly any other bowl used with the mixer. The bowl 102 of FIGS. 9-12 is similar to the bowl 72 of FIG. 6 in that the bowl 102 has brackets 76, 78 (not shown in FIGS. 9-12) with openings 80 therein, and the yoke 20 has upwardly-extending pins 82, 84 (not shown in FIGS. 9-12) similar to the yoke 20 shown in FIG. 6. The detent mechanism 104 includes a locking bracket 106 coupled to an outer surface 108 of the bowl 102, the locking bracket 106 including a generally circular opening 109 therein. The yoke 20 may have a generally hemispherically-shaped stainless steel pad 120 located thereon. The detent mechanism 104 includes a pivotable lock handle 110, which includes a gripping portion 107.

Figure 9:
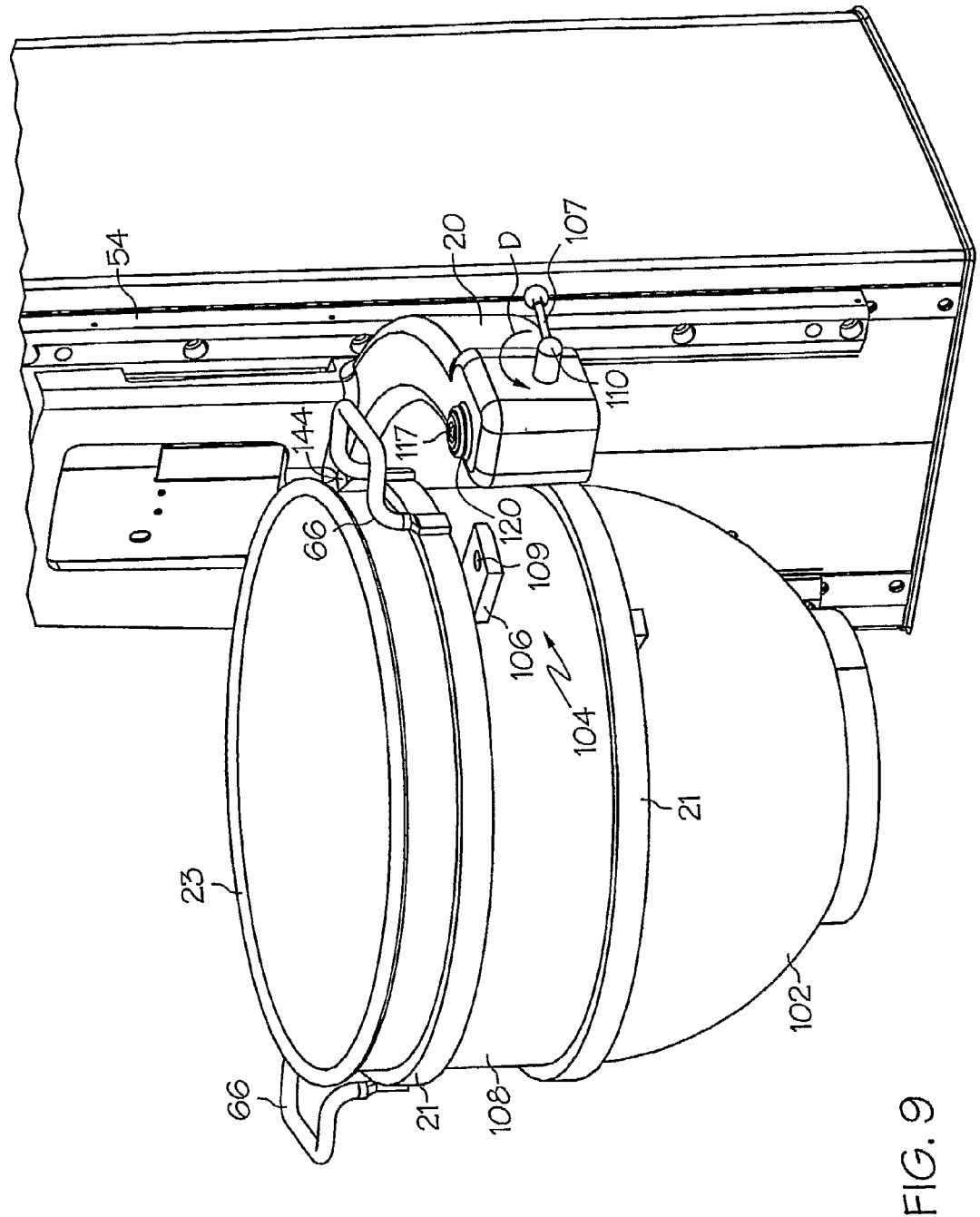
FIG. 9 is a perspective view of a bowl, yoke, and part of a mixer body, illustrating another detent mechanism, with the bowl in the loading position.
Figure 12:
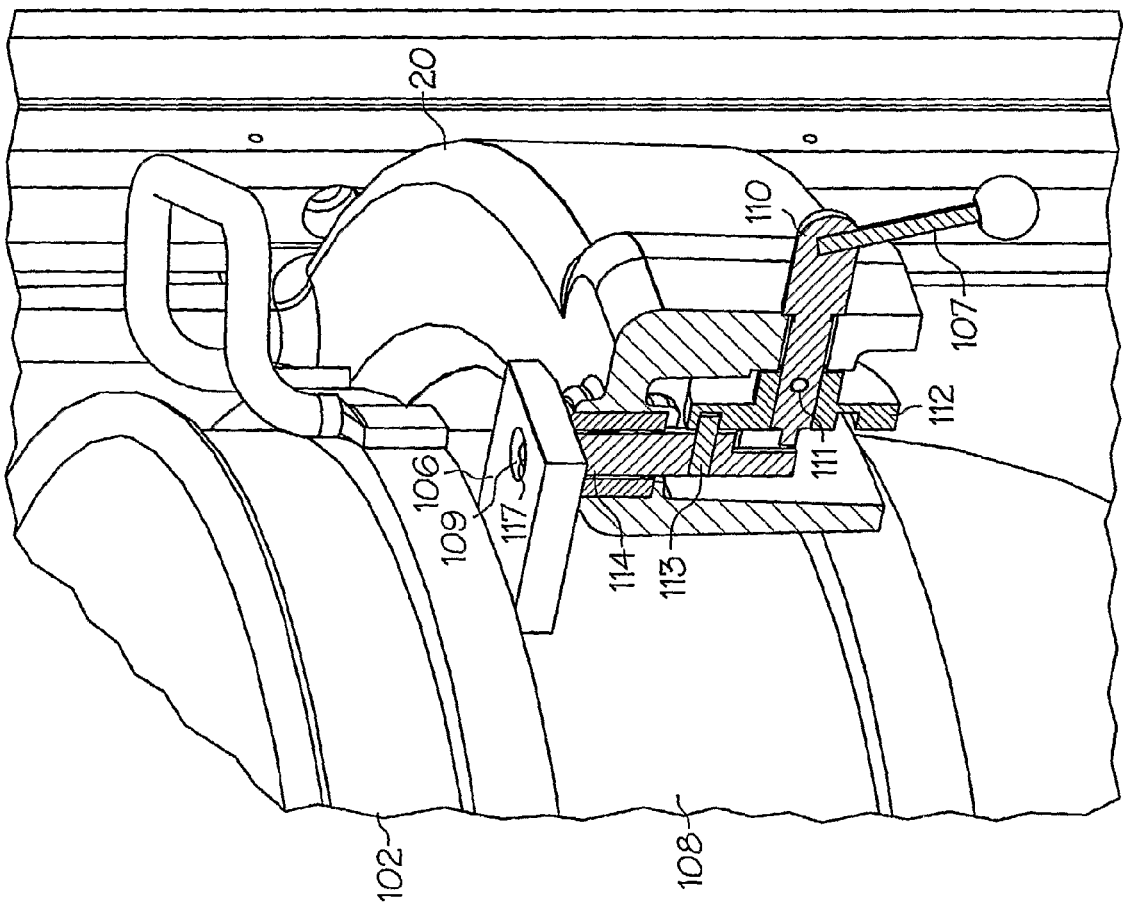
FIG. 12 is a perspective partial cross section of the locking mechanism of the mixer of FIG. 9.

As shown in FIG. 12, the lock handle 110 is rotationally coupled to a cam 112 via a pin (not shown) passed through aligned openings 111 formed in both the handle 110 and cam 112. The cam 112 is in turn rotationally coupled to a locking pin 114 via a drive pin 113. The locking pin 114 is generally vertically oriented, and includes a generally hemispherical tip 117 received in the pad 120. The lock handle 110, cam 112 and locking pin 114 are rotationally coupled together such that the lock handle 110 can be pivoted to cause the locking pin 114 to be moved vertically. For example, FIG. 9 illustrates the detent mechanism 104 in its unlocked position wherein the locking pin 114 is flush with, or recessed below, the pad 120. When the lock handle 110 is rotated in the direction of arrow D of FIG. 9, the cam 112 is rotated in the direction of arrow D and the locking pin 114 is moved vertically upwardly such that the locking pin 114 protrudes above the pad 120 (see FIGS. 10 and 10A wherein the lock handle 110 has been rotated about 270°). Conversely, the lock handle 110 can be rotated in the direction of arrow E of FIGS. 10 and 10A to move the locking pin 114 vertically downwardly such that the locking pin 114 is flush with or recessed below the pad 120.

Figure 10:
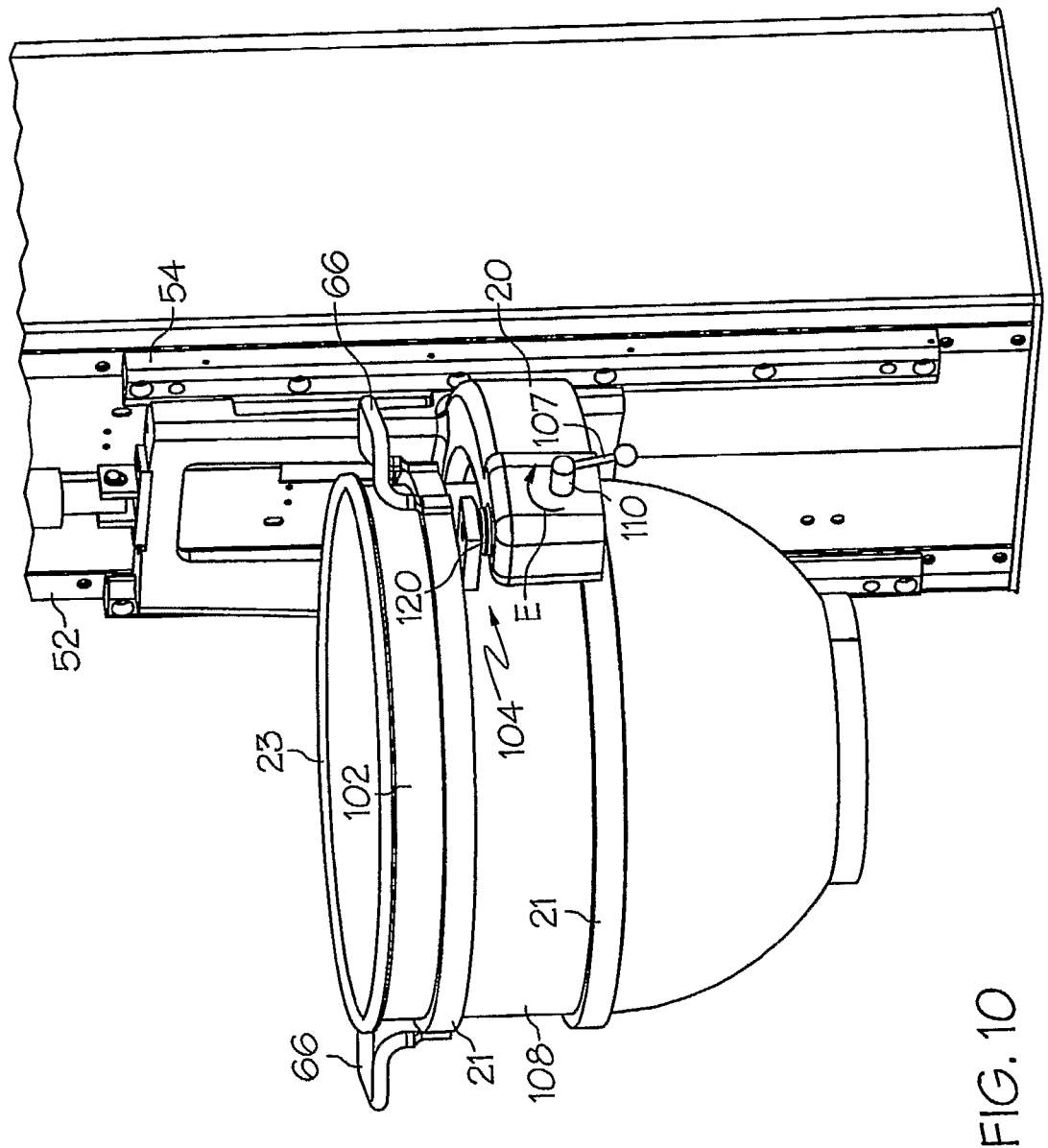
FIG. 10 is a perspective view of the bowl, yoke, and part of the mixer body of FIG. 9, with the bowl in its closed position.

In this manner, when the bowl 102 is in its closed position as shown in FIG. 10, the lock handle 110 can be rotated such that the tip 117 of the locking pin 114 protrudes above the pad 120 and is received in the opening 109 of the locking bracket 106 to maintain the bowl 102 in its closed position. When it is desired to release the detent mechanism 104 and move the bowl 102 out of the closed position, the handle 110 is rotated in the direction of arrow E to retract the locking pin 114. In this manner, the locking pin 114 effectively operates as a retractable mounting pin. The locking pin 114 could also be maintained in the extended position by friction, an over-center mechanism, or another detent or other similar means. Of course, a wide variety of other detent mechanisms may be used to maintain the bowls 18, 72, 102 in the closed position without departing from the scope of the invention, including a variety of latches, hooks, interengaging geometries, clasps, clips, frictionally engaging surfaces, magnets and the like. For example, the bowl may include an outwardly-extending protrusion, and the yoke may include a recess that is shaped to receive the protrusion therein. In this manner, in order to move the bowl into its closed position, the bowl may be lifted slightly upwardly and pivoted into the closed position such that the protrusion is located over the recess. The bowl can then be lowered such that the protrusion is received in the recess to maintain the bowl in the closed position.

Figure 10A:
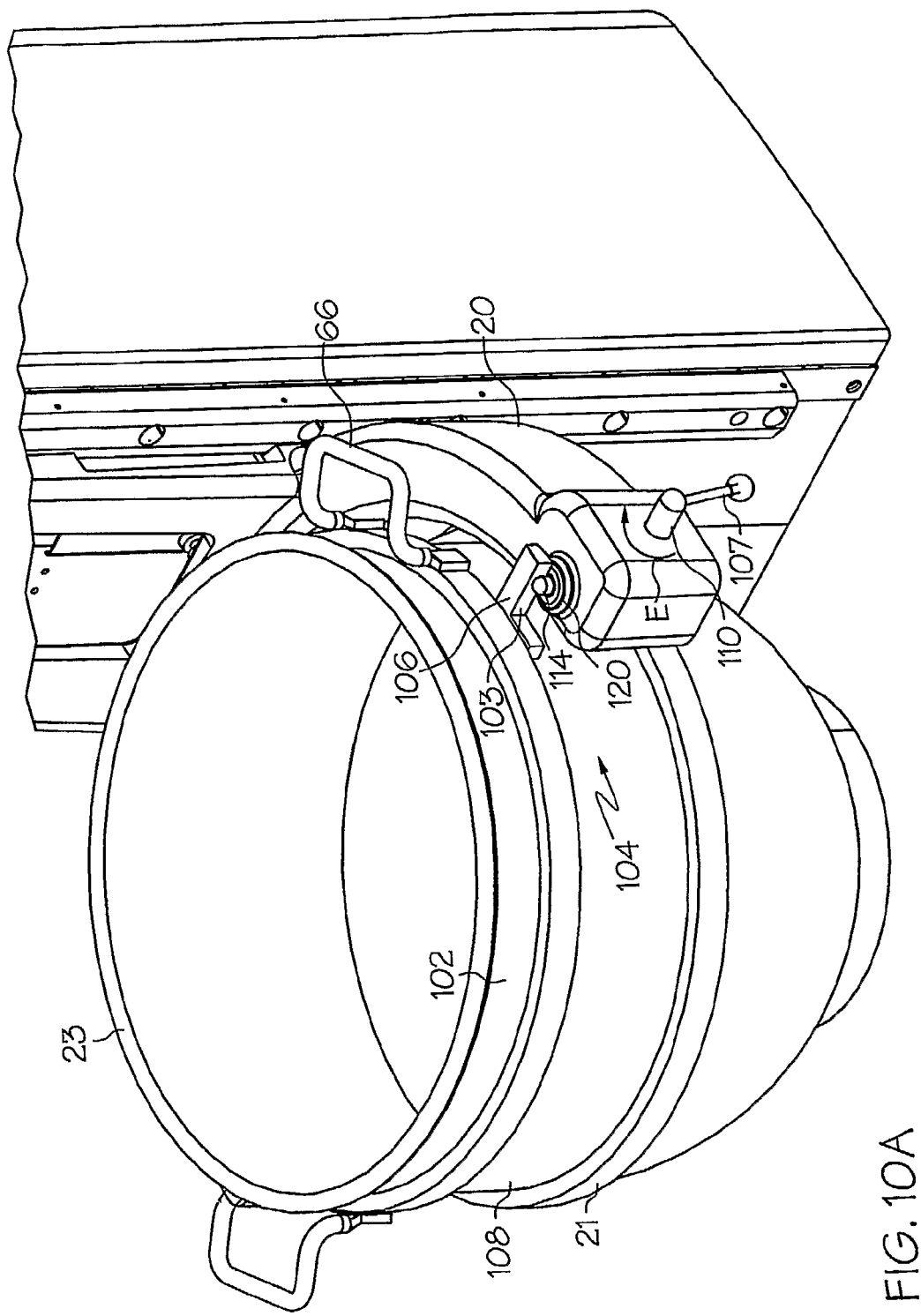
FIG. 10A is a perspective view of the bowl, yoke, and part of the mixer body of FIG. 10 illustrating an alternate bracket.

Although the bracket 106 preferably includes an opening 109 located therein such that the bowl 102 is blocked from pivoting in both directions, the bracket 106 need not include an opening 109 located therein as shown in FIG. 10A. In this case, the bracket 106 is located behind the locking pin 114, and the bracket 106 has an engagement surface 103 which engages the locking pin 114 and prevents the bowl 102 from pivoting away from the closed position. Thus, the bowl 102 can include nearly any protrusion, bracket, pin, or the like that can be located behind the locking pin 114 when the locking pin 114 is in its extended position. Furthermore, instead of including a hole or opening, the bracket 106 may include an indentation that receives the pin therein. The bracket 106 may also include a partial opening similar to the openings 80' shown in FIGS. 18 and 19.

Figure 13:
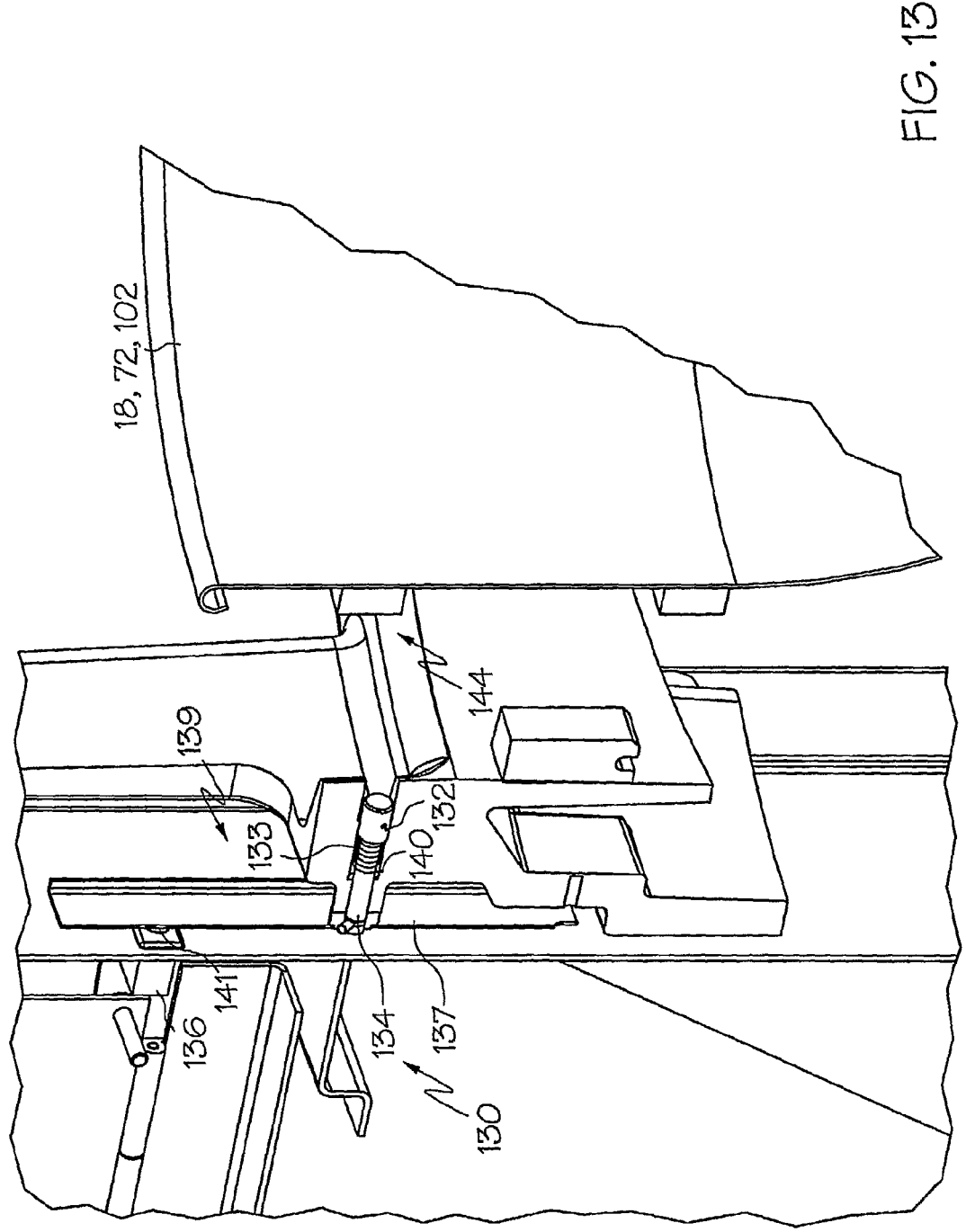
FIG. 13 is a perspective partial cross section of the mixer of FIG. 9, illustrating the bowl switch in its open position.
Figure 14:
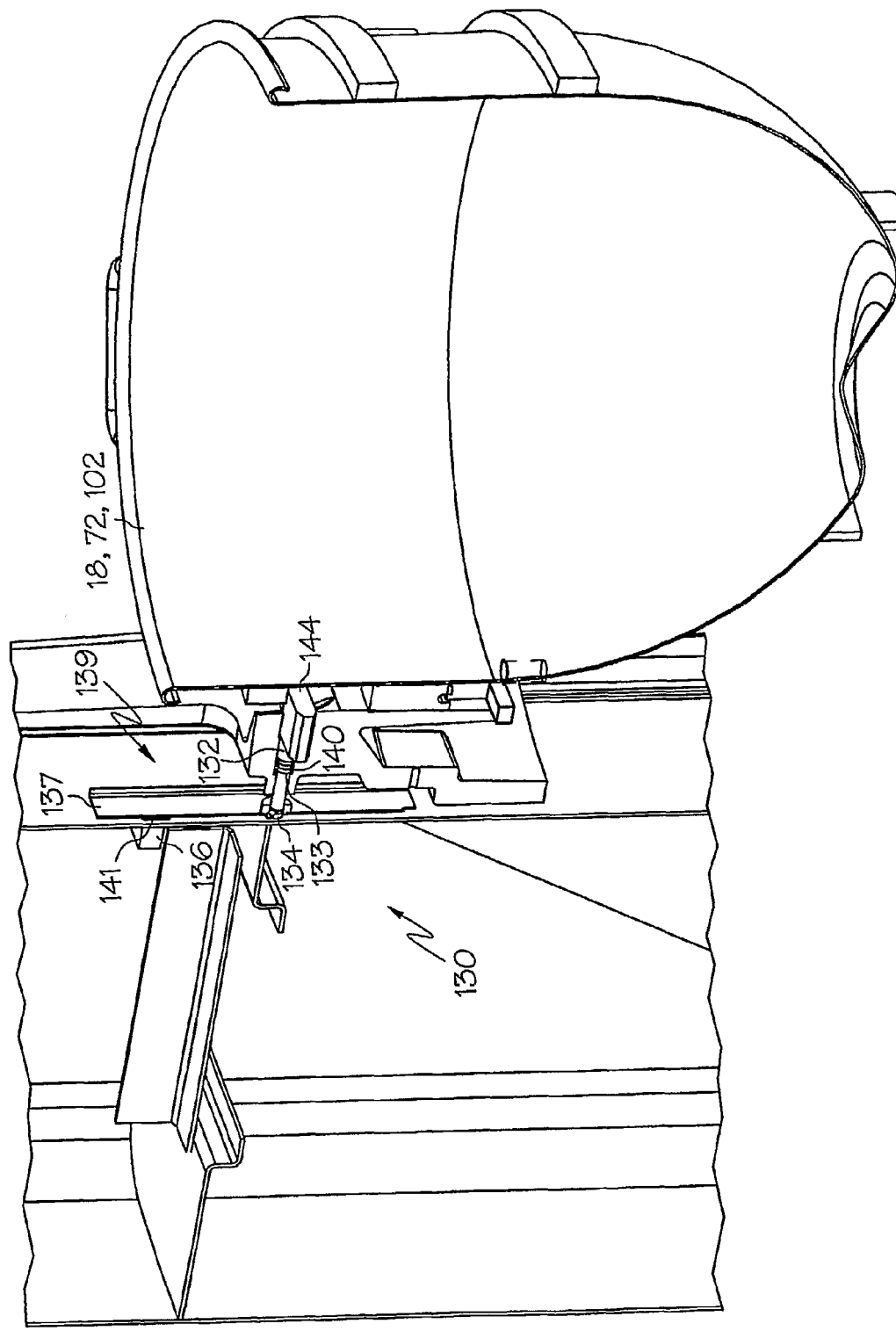
FIG. 14 is a perspective partial cross section of the mixer of FIG. 9, illustrating the bowl switch in its closed position.
Figure 15:
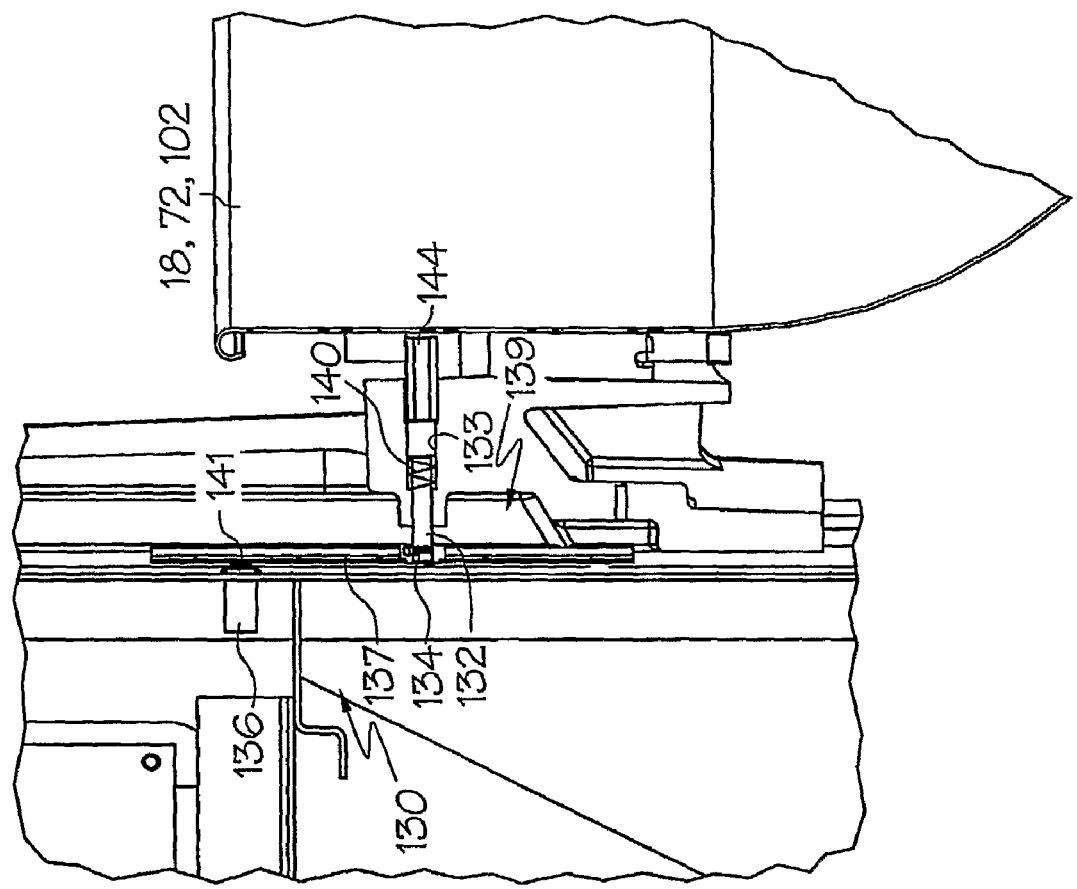
FIG. 15 is a side cross section of the bowl of FIG. 9, illustrating the bowl switch in its closed position.

As illustrated in FIGS. 13-15, the mixer of the present invention may also include a sensor, generally designated 130, to detect when the bowl 18, 72, 102 is in its closed position. In the illustrated embodiment, the sensor 130 includes a spring loaded plunger 132 that is received in a slot 133 of the mixer body 12. The inner end 134 of the plunger 132 is coupled to a generally vertically-extending switch plate 137. The plunger 132 and switch plate 137 together form an actuating assembly 139. The sensor 130 also includes a limit switch 136 having a trigger 141 coupled to the mixer body 12. The sensor 130 includes a spring 140 located about the plunger 132 to bias the plunger 132 away from the mixer body 12 and toward the bowl 18, 72, 102. In this manner, in the absence of outside forces the switch plate 137 is spaced away from the trigger 141.

The bowl 18, 72, 102 may include a lug or protrusion 144 located on an outer surface of the bowl and extending generally outwardly therefrom. As shown in FIGS. 14 and 15, the protrusion 144 is shaped to engage the plunger 132 and move the plunger 132 inwardly (thereby compressing the spring 140) when the bowl 18, 72, 102 is located in the closed position. When the protrusion 144 engages the plunger 132 and moves the plunger 132 inwardly, the switch plate 137 is pressed into contact with the trigger 141 of the limit switch 136, thereby triggering the limit switch 136. The limit switch 136 can then send a signal to a central controller, processor or CPU of the mixer to indicate that the bowl 18, 72, 102 is in the closed position. In one embodiment, the bowl 18, 72, 102 and/or plunger 132 may include a disengagement feature such that the protrusion 144 engages and pulls the plunger 132 outwardly when the bowl 18, 72, 102 is pivoted away from its closed position. The disengagement feature may includes various inter engaging geometries, rotating cams and the like.

Once the bowl 18, 72, 102 is in its closed position and the limit switch 136 is triggered, the bowl may be raised into the operating position and the contents of the bowl may be mixed by the mixing element 16. The switch plate 137 is coupled to the yoke 20 and therefore moves vertically with the yoke 20 and bowl 18, 72, 102 as the yoke 20 is moved. Thus, the switch plate 137 may be a relatively long, vertically extending strip that slides over the trigger 141 as the yoke 20 is raised so that the switch plate 137 can thereby maintain the limit switch 136 in its closed or triggered state. Thus, the switch plate 137 is preferably long enough such that at least part of the switch plate 137 is located over the trigger 141 for the entire vertical range of motion of the yoke 20.

If desired, the spring 140 may be sufficiently stiff such that the bowl 18, 72, 102 cannot remain in the closed position without activating the detent mechanism 104. In other words, the spring 140 may cause the bowl 102 to pivot out of the closed position unless the detent mechanism 104 is activated to lock the bowl 18, 72, 102 in the closed position. In this manner, the ejection of the bowl 18, 72, 102 out of the closed position by the spring 140 can serve as a reminder to the operator to activate the detent mechanism 104. Of course, the mixer may have another spring or other structure besides the spring 140 to eject the bowl out of the closed position.

Figure 16:
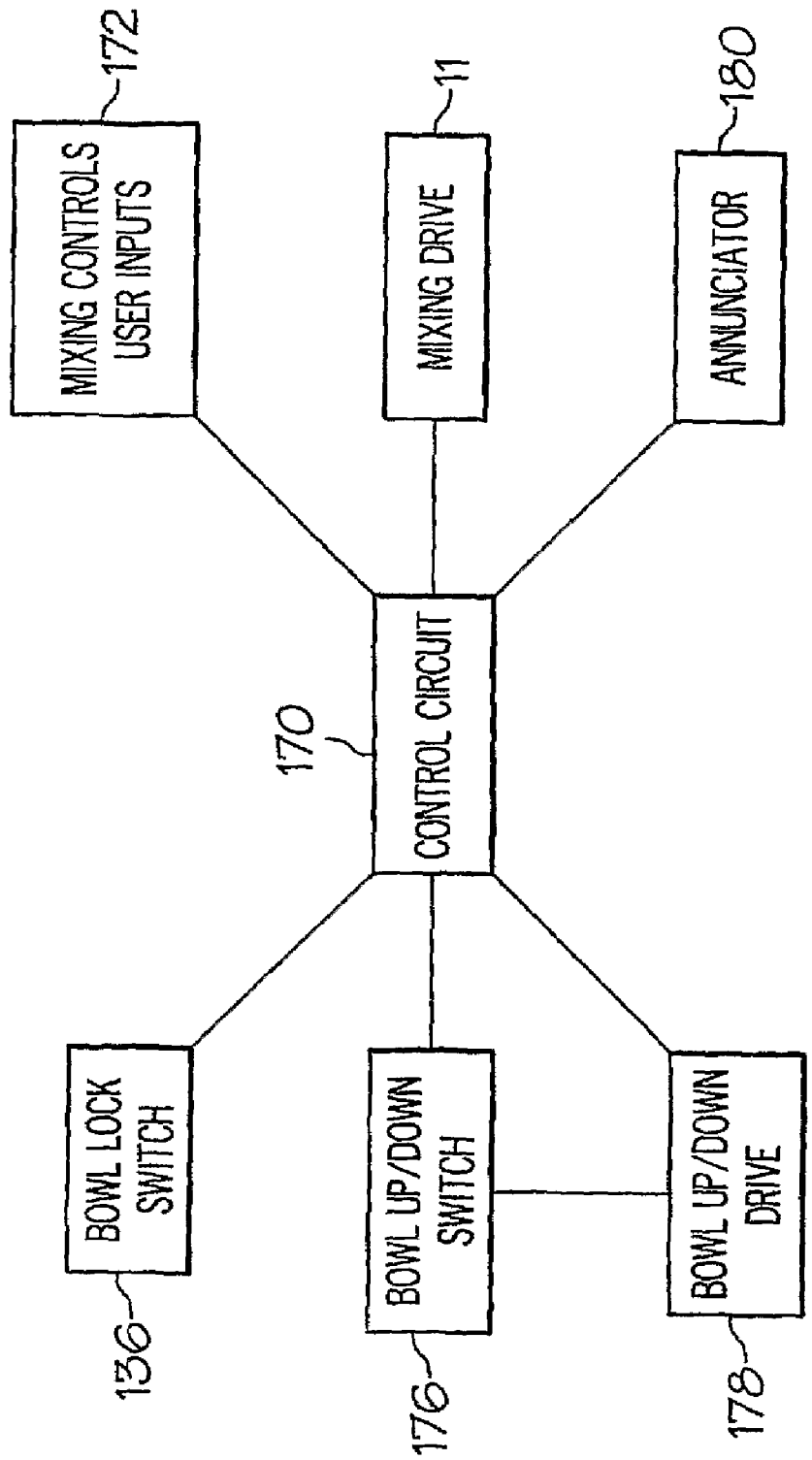
FIG. 16 is a block diagram illustrating one embodiment of a control structure architecture that may be used to control a mixer.

FIG. 16 illustrates a block diagram of a control structure that may be used in association with the sensor 130 to control mixer operations. The limit switch or lock switch 136 is preferably coupled to a control circuit 170. The control circuit 170 is coupled to a user input panel 172, which can be operated by a user to input the desired rotational speed of the mixing element 16, the duration of mixing, etc. The control circuit 170 is also coupled to the mixing drive 11 to control the rotation of the output component 15 and mixing element 16. The mixer may also include a bowl up/down switch 176 that can be actuated by an operator to trigger a bowl up/down drive 178 to raise and/or lower the yoke and bowl. The bowl up/down switch 176 is coupled to the control circuit 170 and to the bowl up/down drive 178 which drives the vertical movement of the bowl and yoke. The bowl up/down drive 178 is also coupled to the control circuit 170. The control circuit 170 is also connected to an annunciator 180, such as a buzzer, that can be activated upon the occurrence of certain events.

The control structure of FIG. 16 may be used to ensure that the switch 136 must be closed before the bowl up/down drive 178 and the mixing drive 11 are activated. More particularly, if the switch 136 is not closed, the control circuit 170 may disable the mixing drive 11, bowl up/down drive 178 and/or the bowl up/down switch 176. Alternately, if the switch 136 is not closed, the up/down drive 178 may be controlled such that the bowl can be lowered but cannot be raised. Similarly, if the switch 136 becomes opened during lifting or mixing operations, the control circuit 170 may disable the mixing drive 11, bowl up/down drive 178 and/or the bowl up/down switch 176 to stop any lifting or mixing operations. If the sensor 130 becomes opened during mixing operations, besides disabling the mixing drive 11, the control circuit may trigger the annunciator 180 to attract the attention of the operator.

Figure 17:
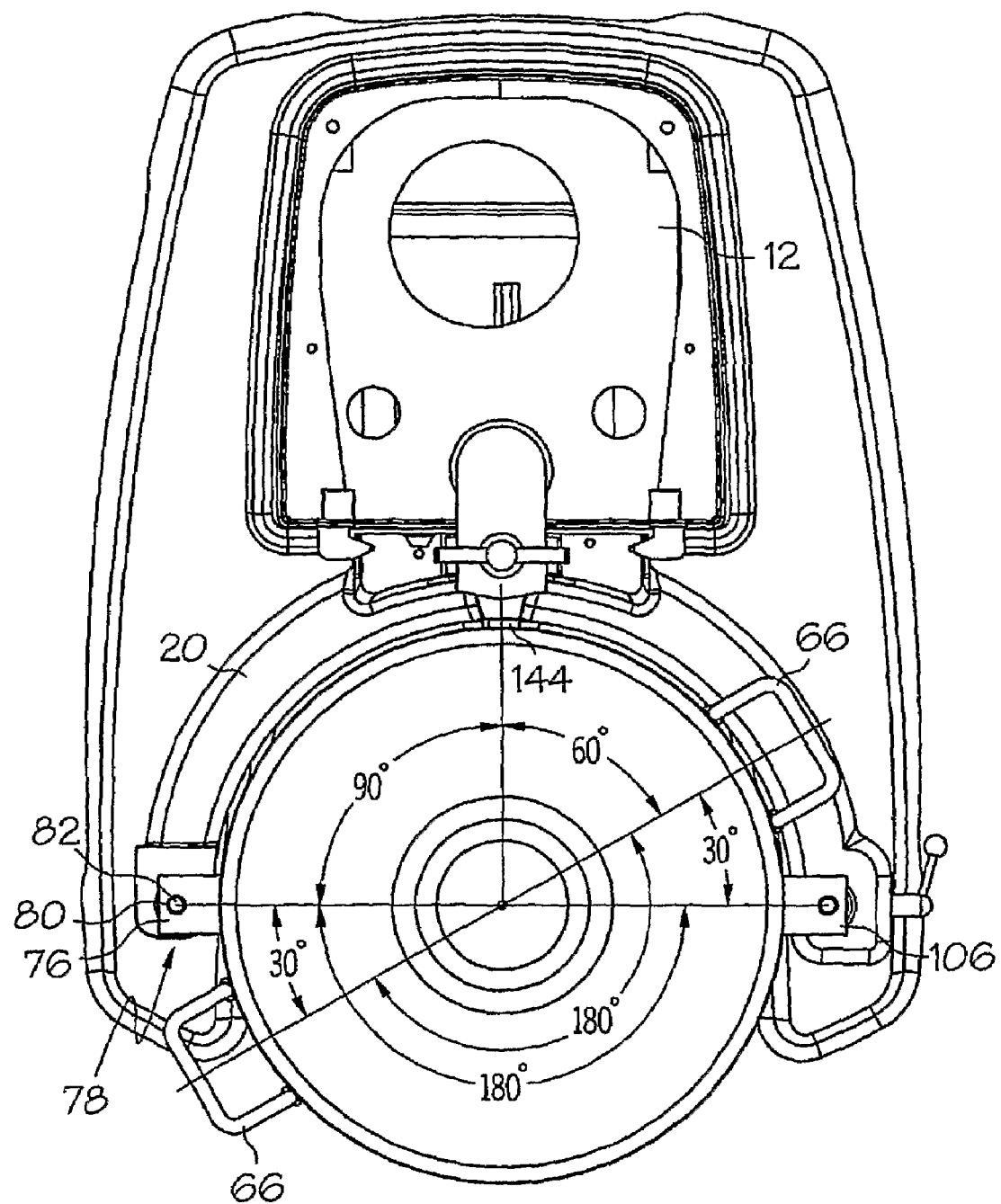
FIG. 17 is a top view of the mixer of FIG. 9.

The location and orientation of the various components of the bowl 102 may be varied to conform the bowl to various mixers. However, FIG. 17 illustrates one embodiment of the bowl 102. In the illustrated embodiment, the handles 66 are about 180 degrees apart from each other. Similarly, the locking bracket 106 and the mounting brackets 76, 78 are about 180 degrees apart from each other. The mounting brackets 76, 78 are spaced about 30 degrees from the adjacent handle 66, and the protrusion 144 is spaced about 90 degrees from the locking brackets 76, 78 and locking bracket 106.

Figure 22:
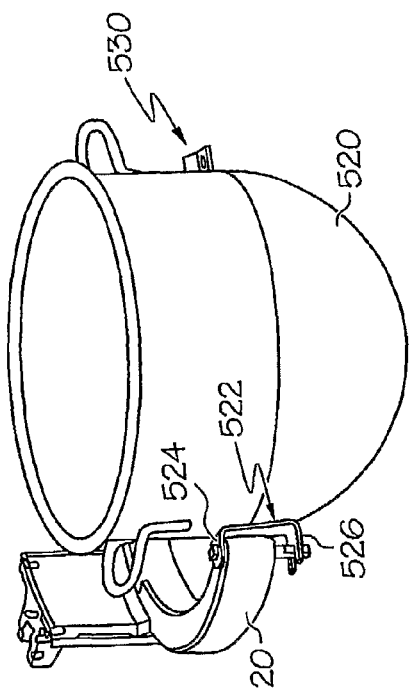
FIGS. 20-22 depict a mixer system with a rotating pin arrangement.
Figure 21:
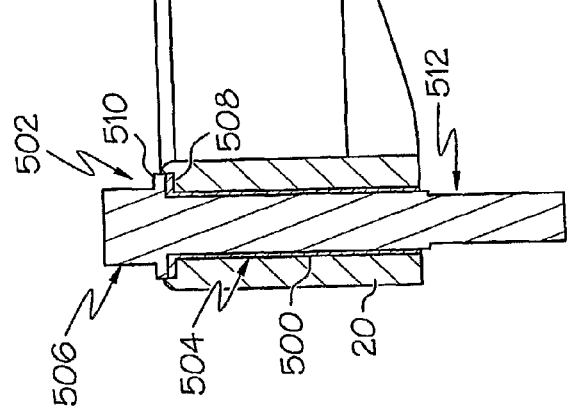
Figure 20:
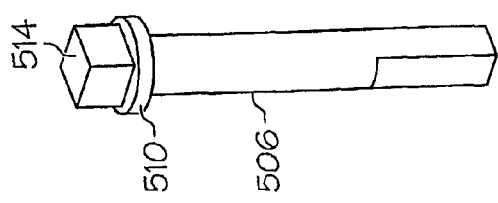
Figure 25:
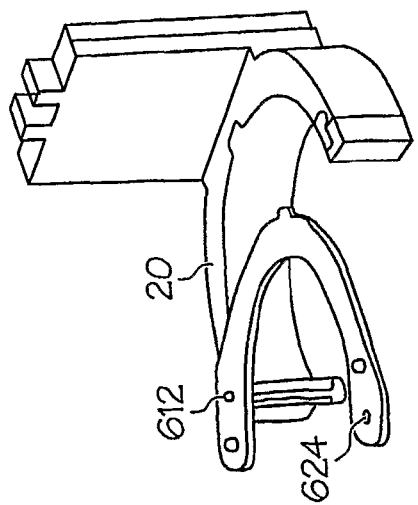
FIGS. 23-28 depict a mixer system with a pivoting bowl collar arrangement.
Figure 24:
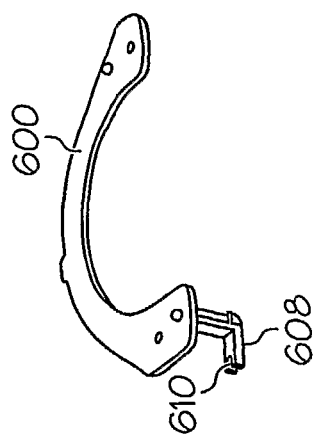
Figure 23:
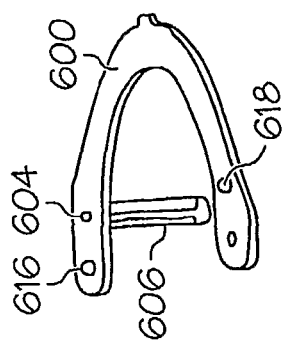
Figure 28:
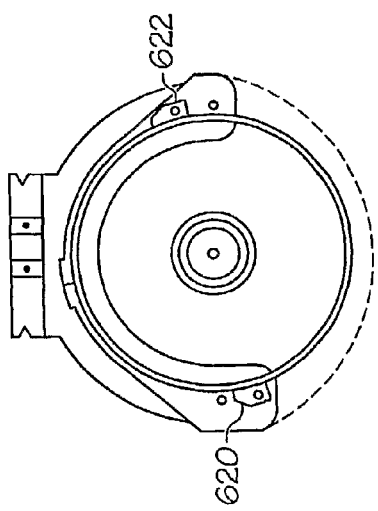
Figure 27:
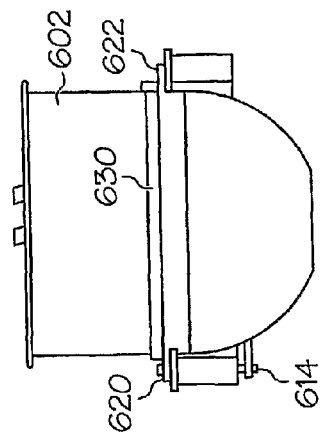
Figure 26:
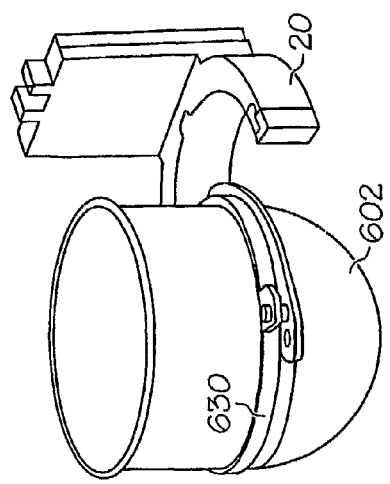

Referring now to FIGS. 20-22, in another embodiment one side or arm of the bowl yoke 20 is provided with a vertically extending through opening 500 into which a rotating pin assembly 502 is fitted. Pin assembly 502 includes a bushing 504 that is fixedly positioned in the opening 500 and a pin 506 that passes through the bushing 504 and that can rotate relative to the bushing 504. The upper side of the bushing includes an annular lip 508 that is recessed into an enlarged top portion of the through opening 500 and the upper portion of the pin 506 includes a corresponding lip 510 that rests upon bushing lip 508. The lower surface of lip 510 slides across the upper surface of lip 508 during pin rotation. A pin, nut assembly or other structure (not shown) could be provided on the lower portion 512 of the pin that extends from the bottom of the yoke 20 to prevent the pin 506 from being removed from the bushing 504. In the illustrated example the exposed upper portion 514 of the pin 506 is square shaped (when viewed from the top). The lower pin portion 512 may also include a rectangular shape as shown.

The bowl 520 includes a bracket arrangement 522 with upper and lower bracket extensions 524 and 526. The upper bracket extension 524 includes a square shaped opening for engaging the square shaped pin portion 514 and the lower bracket extension 526 includes a generally radially extending (relative to an upright axis of the bowl) slot for engaging the lower pin portion 512. When the bowl 520 is moved for a pivoting operation, the rotational forces are transferred by the bracket arrangement 522 to the pin 506 causing the pin to rotate in the bushing 504. It is recognized that other non-circular shapes (e.g., oval, elliptical, triangular, more than 4 sides or some non-regular shape) could be used for the upper portion of the pin and the lower portion of the pin, as well as the corresponding bracket openings. Moreover, to transfer bowl movement forces to the pin for causing pin rotation, only one of the upper pin portion and the lower pin portion could be non-circular, with the other being circular. The bowl may include a second bracket arrangement 530 on an opposite side thereof for locking the bowl into its closed position relative to the yoke 20. The bracket arrangement may include an opening and an inclined surface as previously described.

The embodiment of FIGS. 20-22 may be combined with the bowl closed sensor arrangement previously described, or any other suitable bowl closed sensor arrangement (e.g., including mechanical, optical or magnetic sensors). The bowl could include a corresponding protrusion for triggering the bowl closed sensor. Likewise mixer function control based upon the open/closed status of the bowl, as well as the up/down status of the yoke could be as described above.

In the embodiment of FIGS. 20-22 additional features could be added, such as cooperating surfaces on the upper portion 514 of the pin and the bracket extension 524 respectively that cause the pin to rotate into proper alignment with the bracket extension opening as the bracket extension 524 moves downward toward the pin during mounting of the bowl to the mixer body. In another variation, the pin assembly 502 may include a torsion spring arrangement that causes the pin 506 to always be biased into a certain position when there are no external rotational forces acting on it.

Referring now to FIGS. 23-28, another alternative embodiment is provided in which a two-piece pivoting bowl arrangement is provided by using a bowl collar 600 that is mounted in a pivoting relationship with the mixer body yoke 20, with the bowl 602 supported on the bowl collar for mixing and for pivoting movement. In the illustrated example the bowl collar is generally U-shaped, but the collar could also form a closed ring (e.g., as shown schematically in dashed outline in FIG. 28). The collar 600 includes an upper opening 604 and downwardly extending bracket 606 with an extension 608 including a slot 610. The mixer body yoke 20 includes an upper pin member 612 and a lower pin member 614 for engaging the opening 604 and slot 610 to permit rotation of the bowl collar about a pivot axis defined by the pin members. The pin members could be fixed or rotatable in the nature of the previously described pin and bushing arrangement. The illustrated bowl collar 600 includes bowl mount pins 616 and 618 and the bowl 602 includes corresponding spaced apart mount brackets 620 and 622 with openings to receive the mount pins 614 and 616 so that the bowl is supported on the collar 600 and pivots with the collar 600. Additionally, the bowl 602 may include an exterior band member 630 that is positioned to rest on the upper surface of the collar 600. The collar 600 may also include an opening 624 for use in locking the bowl collar 600 in the closed position (e.g., as by interaction with a downwardly retracting pin such as that described above). The bowl 602 can readily be removed from the bowl collar 600 for cleaning etc. In this arrangement either the bowl collar 600 or bowl 602 could include a bowl closed sensor triggering protrusion, although it is generally preferred that such member be included on the bowl itself so as to restrict at least certain mixer functions when the bowl is not present but the bowl collar 600 is moved to its closed position.

Having described the invention in detail and by reference to the preferred embodiments, it will be apparent that modifications and variations thereof are possible without departing from the scope of the invention.

We claim:

1. A mixer system comprising:
a mixer body having a downwardly extending rotatable output component and a bowl support positioned below the output component, the bowl support including at least one rotatable pin member mounted thereon for defining a bowl pivot axis, the rotatable pin member capable of rotation relative to the bowl support; and
wherein a bushing is mounted in the bowl support and the pin extends through the bushing and is rotatable relative to the bushing;
wherein an upper portion of the pin member has a non-circular shape and the bowl includes a bracket with a corresponding non-circular shape engaged with the upper portion of the pin member.

2. A mixer system comprising:
a mixer body having a downwardly extending rotatable output component and a bowl support positioned below the output component, the bowl support including at least one rotatable pin member mounted thereon for defining a bowl pivot axis, the rotatable pin member capable of rotation relative to the bowl support; and
wherein a bushing is mounted in the bowl support and the pin extends through the bushing and is rotatable relative to the bushing
wherein the bushing is inserted into a vertically extending through opening of the bowl support, an upper portion of the bushing includes an annular lip providing a bearing surface, an upper portion of the pin includes an enlarged head portion with a lower side in contact with the bearing surface for sliding against the bearing surface during rotation of the pin, a lower portion of the pin extends beyond the bowl support.

3. A mixer system comprising:
a mixer body having a downwardly extending rotatable output component and a bowl support positioned below the output component, the bowl support including left and right arms;
a two-piece pivoting bowl arrangement mounted on the bowl support, including a bowl collar pivotally mounted to one arm of the bowl support for rotation about a pivot axis on the one arm, and a bowl removably supported on the bowl collar for rotation with the bowl collar to move between a mixing position relative to the mixer body and an open position relative to the mixer body;
wherein the bowl collar includes first and second spaced apart upwardly extending pins and the bowl includes a first exterior bracket engaged with the first pin and a second exterior bracket engaged with the second pin.

4. The mixer system of claim 3 wherein the bowl collar is generally U-shaped.

5. The mixer system of claim 3 wherein the bowl collar is generally ring-shaped.

6. The mixer system of claim 3 wherein the bowl includes an exterior bend that rests upon an upper surface of the bowl collar.

7. A mixer system, comprising:
a mixer body having a head portion with a downwardly extending rotatable output component, a bowl support yoke positioned below the head portion and mounted for vertical movement on the mixer body between a raised position and a lowered position relative to the head portion, a downwardly extending locking pin mounted on the mixer body between the head portion and the bowl support yoke;
a bowl mounted on the bowl support yoke, the bowl including a rear locking bracket having an opening therein, the opening positioned such that (i) the downwardly extending locking pin is received in the opening when the bowl support yoke is in the raised position and (ii) the downwardly extending locking pin is removed from the opening when the bowl support yoke is in the lowered position.

8. The mixer system of claim 7 wherein the downwardly extending locking pin is tapered.

9. The mixer system of claim 7 wherein
the mixer body includes at least one additional pin member on the bowl support yoke;
the mixer bowl includes at least one additional bracket member with an opening therein;
the additional pin member received within the additional bracket member both when the bowl support yoke is in the raised position and when the bowl support yoke is in the lowered position.

* * * * *